(12) United States Patent
Wentz

(10) Patent No.: US 10,887,100 B2
(45) Date of Patent: Jan. 5, 2021

(54) SYSTEMS AND METHODS FOR DISTRIBUTED KEY STORAGE

(71) Applicant: Ares Technologies, Inc., Cambridge, MA (US)

(72) Inventor: Christian Wentz, Providence, RI (US)

(*) Notice: Subject to any disclaimer, the term of this patent is extended or adjusted under 35 U.S.C. 154(b) by 0 days.

(21) Appl. No.: 16/681,750

(22) Filed: Nov. 12, 2019

(65) Prior Publication Data

US 2020/0162251 A1    May 21, 2020

Related U.S. Application Data

(60) Provisional application No. 62/760,832, filed on Nov. 13, 2018, provisional application No. 62/758,367, filed on Nov. 9, 2018.

(51) Int. Cl.

| | |
|---|---|
| *H04L 9/08* | (2006.01) |
| *H04L 9/32* | (2006.01) |
| *G06F 21/60* | (2013.01) |
| *G06F 21/62* | (2013.01) |

(52) U.S. Cl.
CPC .......... *H04L 9/0894* (2013.01); *G06F 21/602* (2013.01); *G06F 21/6218* (2013.01); *H04L 9/3213* (2013.01); *H04L 9/3218* (2013.01)

(58) Field of Classification Search
CPC ... H04L 9/0894; H04L 9/3213; H04L 9/3218; G06F 21/602; G06F 21/6218
See application file for complete search history.

(56) References Cited

U.S. PATENT DOCUMENTS

| | | | |
|---|---|---|---|
| 6,298,442 B1* | 10/2001 | Kocher | G06F 7/723 380/28 |
| 6,327,661 B1* | 12/2001 | Kocher | G06K 19/073 713/193 |
| 7,793,103 B2 | 9/2010 | Fu | |
| 8,762,722 B2 | 6/2014 | Roeder | |
| 8,948,399 B2 | 2/2015 | Sabin | |
| (Continued) | | | |

FOREIGN PATENT DOCUMENTS

| | | |
|---|---|---|
| WO | 2018189656 A1 | 10/2018 |
| WO | 2018193355 A1 | 10/2018 |

*Primary Examiner* — Yonas A Bayou
(74) *Attorney, Agent, or Firm* — Caldwell Intellectual Property Law

(57) ABSTRACT

A system for distributed key storage, comprising a requesting device communicatively connected to a plurality of distributed storage nodes, the requesting device designed and configured to receive at least a confidential datum, select at least a distributed storage node of a plurality of distributed storage nodes, whereby selecting further comprises receiving a storage node authorization token from the at least a distributed storage node, querying an instance of a distributed authentication listing containing authentication information using at least a datum of the storage node authorization token, retrieving an authentication determination from the instance of the authentication listing, and selecting the at least a distributed storage node as a function of the authentication determination, generate at least a retrieval authentication datum, and transmit the at least a confidential datum and the at least a retrieval verification datum to the at least a distributed storage node.

21 Claims, 6 Drawing Sheets

(56) References Cited

U.S. PATENT DOCUMENTS

| | | |
|---|---|---|
| 9,026,805 B2 | 5/2015 | Acar |
| 9,100,186 B2 * | 8/2015 | O'Hare .................. H04L 9/085 |
| 9,509,506 B2 | 11/2016 | Hughes |
| 10,103,880 B2 * | 10/2018 | Fu ......................... H04L 9/0861 |
| 2013/0173928 A1 * | 7/2013 | Kocher ................. H04L 9/0631 |
| | | 713/189 |
| 2014/0247944 A1 * | 9/2014 | Kocher ................. H04L 9/085 |
| | | 380/286 |
| 2015/0280907 A1 * | 10/2015 | Kocher .................... G06F 8/71 |
| | | 380/30 |
| 2016/0026826 A1 * | 1/2016 | Kocher .............. G06F 12/1408 |
| | | 713/1 |
| 2016/0048684 A1 * | 2/2016 | Kocher ................ H04L 9/3247 |
| | | 713/2 |
| 2017/0310472 A1 | 10/2017 | Garcia-Morchon |
| 2018/0109372 A1 * | 4/2018 | Fu .......................... H04L 9/083 |
| 2018/0109377 A1 | 4/2018 | Fu |
| 2018/0276668 A1 | 8/2018 | Li |
| 2019/0312734 A1 * | 10/2019 | Wentz .................... H04L 9/006 |

* cited by examiner

SYSTEMS AND METHODS FOR DISTRIBUTED KEY STORAGE

CROSS-REFERENCE TO RELATED APPLICATIONS

This application claims priority to Provisional Application No. 62/760,832 filed on Nov. 13, 2018 and entitled "SYSTEMS, DEVICES, AND METHODS FOR DISTRIBUTED KEY STORAGE" the entirety of which is incorporated herein by reference. This application further claims priority to U.S. Provisional Application 62/758,367, filed on Nov. 9, 2018 and entitled "METHODS AND SYSTEMS FOR A DISTRIBUTED CERTIFICATE AUTHORITY," the entirety of which is incorporated herein by reference.

FIELD OF THE INVENTION

The present invention generally relates to the field of data storage and authentication in distributed computing systems. In particular, the present invention is directed to systems and methods for distributed key storage.

BACKGROUND

Secure storage of authentication information has become an increasingly important problem. Cryptocurrency wallets and "vaults" often are nothing more than a collection of private keys or similar authentication data usable to establish a user's right to transfer value in electronic exchanges. User passwords have similarly become more multifarious and complex in response to mounting computer security concerns, resulting in a need on the part of many users to store such passwords electronically. Unfortunately, secure storage of authentication information has also been plagued with challenges; most notably, heightened security typically reduces accessibility, and makes it possible to lose the information entirely, while convenience can come at a high, and sometimes ruinous, risk of lost value or stolen identities.

SUMMARY OF THE DISCLOSURE

In an aspect, a system for distributed key storage includes a requesting device communicatively connected to a plurality of distributed storage nodes and verifying nodes. The requesting device is designed and configured to receive, at least a confidential datum, select, at least a distributed storage node of a plurality of distributed storage nodes, wherein selecting, further comprises receiving, a storage node authorization token from the at least a distributed storage node, querying, an instance of a distributed authentication listing containing authentication information using at least a datum of the storage node authorization token, retrieving, an authentication determination from the instance of the authentication listing, and selecting the at least a distributed storage node as a function of the authentication determination, generate, at least a retrieval verification datum, and transmit, the at least a confidential datum and the at least a retrieval verification datum to the at least a distributed storage node.

In another aspect, a method for distributed key storage using distributed storage nodes and verifying devices includes receiving, at a first requesting device, at least a confidential datum. The method includes selecting, by the first requesting device, at least a distributed storage node of a plurality of distributed storage nodes. Selecting further comprises receiving, a storage node authorization token from the at least a distributed storage node, querying, an instance of a distributed authentication listing containing authentication information using at least a datum of the storage node authorization token, retrieving, an authentication determination from the instance of the authentication listing, and selecting the at least a distributed storage node as a function of the authentication determination. The method includes generating, by the requesting device, at least a retrieval authentication datum. The method includes transmitting, by the requesting device, the at least a confidential datum and the at least a retrieval verification datum to the at least a distributed storage node.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
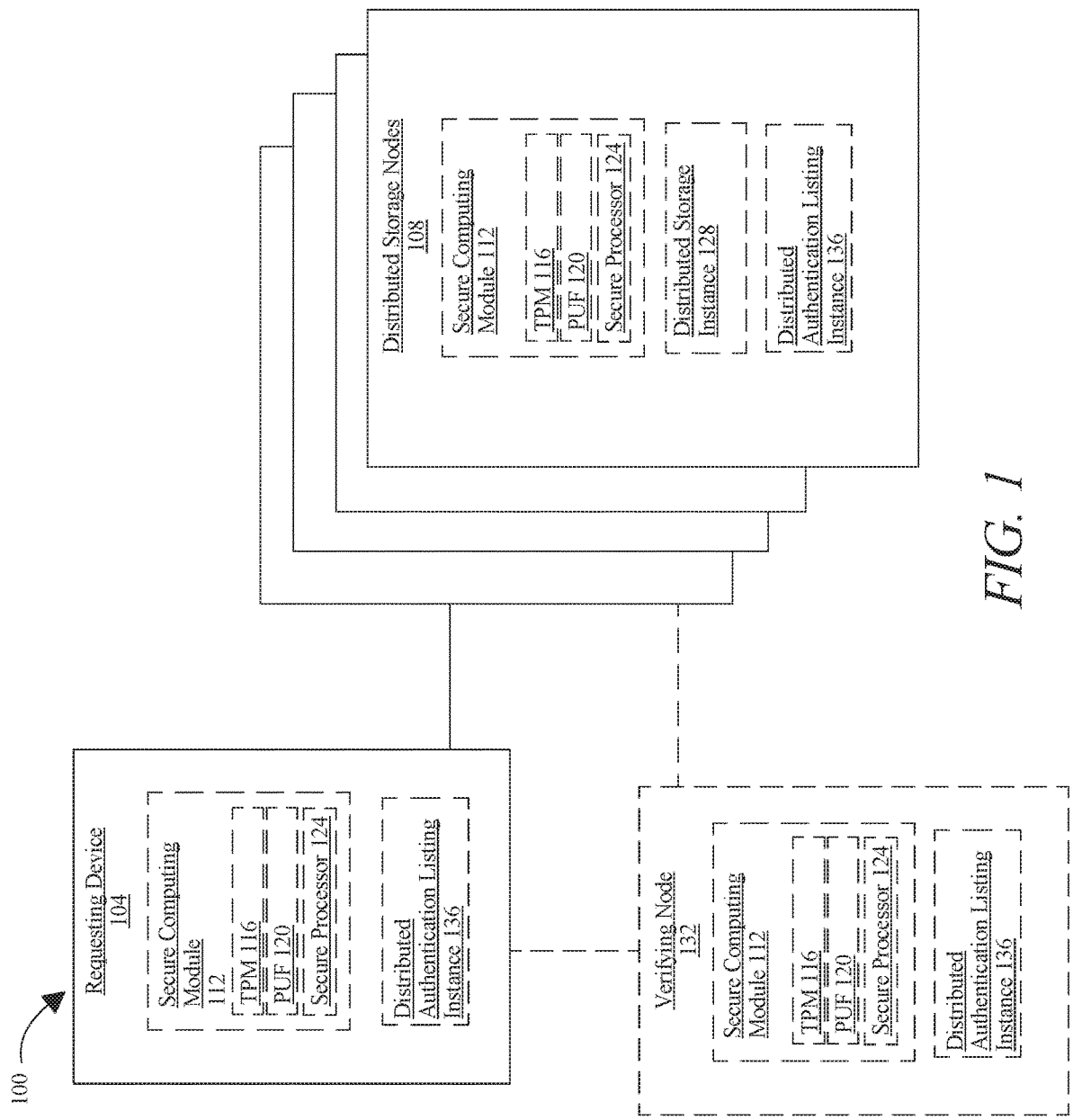
FIG. 1 is a block diagram illustrating an exemplary embodiment of a system for distributed key storage.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to improvements to architecture and processes for storing secure information including authentication information necessary for engagement in digital currency transfers and authentication of digitally signed assertions including cryptographic immutable ledgers, such as block chains. In an embodiment, disclosed systems and methods provide for convenient and secure storage of keys and similar confidential information, by combining aspects of trusted computing and distributed storage. Storage nodes may be authenticated and selected according to trustworthiness, with potential weak points in storage protocols being performed by highly trusted nodes. Rigor in node and user authentication may be varied according to risk levels and user preferences to achieve an ideal balance of convenience and security.

Systems and methods as described herein may involve computation, calculation, assessment, assignment, or use of a confidence level associated with one or more processes, devices, or data, including without limitation one or more processes, appraisals, and/or distributed storage nodes as described herein. A confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is a secure proof performed on an element of data, referred to as a "message"; secure proof may include any secure proof as described in this disclosure. Message may include without limitation an encrypted mathematical representation of a file or other set of data. File or set of data may confer credentials, which may demonstrate, without limitation, any result of any authentication or authorization process performed by a signing device. Credentials, which may take the form of authorization tokens, may be generated, conferred, signed, or otherwise manipulated in any suitable way, including without limitation as disclosed in U.S. Provisional Application 62/758,367. Secure proof may be enacted, without limitation, by encrypting message using a private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file. A digital signature may be evaluated in general using a verification datum associated with a secure proof used to generate digital signature. As a further non-limiting example, digital signature may be performed according to any embodiment described in U.S. Provisional Application 62/815,493, filed on Mar. 8, 2019 and entitled "METHODS AND SYSTEMS FOR IMPLEMENTING AN ANONYMIZED ATTESTATION CHAIN," the entirety of which is incorporated by reference herein. As a digital signature may be seen as an implementation of a secure proof upon message, a digital signature may be referred to herein as a form of secure proof, as indicating that the digital signature represents a manner in which a secure proof is being implemented.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination via any number of means. In a nonlimiting example this may be implemented with the requirement that a threshold number of the group of certificate authorities, and/or a threshold proportion of the group of certificate authorities, agree (e.g. "threshold cryptography"), or alternatively in nonlimiting example via multi-signature such as a BLS signature, group signature, ring signature and the like; a confidence level in each certificate authority may be determined according to any method or means described herein for determination of a confidence level in any device or entity, including without limitation in a distributed storage node as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 112 as described in further detail below; in such scenarios, authentication may include proof by the secure computing module 112 that the secure computing module 112 possesses a secret key to a public key/certificate pair. Additionally or alternatively, one or more verifying nodes as described in further detail below may act as certificate authorities, including using threshold cryptography; the one or more verifying nodes may create authorization tokens as described below, including without limitation storage node authorization tokens. Certificate authority may include any device and/or devices acting as certificate authorities as disclosed in U.S. Provisional Application 62/758,367. Digital signatures may be performed, without limitation, using any interactive or non-interactive zero-knowledge proof; for instance, a proof may be recorded in conjunction with a datum, and a verification may be performed by any party seeking to evaluate the proof. In an embodiment, a proof recorded with a datum may include and/or be generated using a datum such as a private or public key, a secret, a shard as described in more detail below in FIG. 4, and/or secure proof.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for distributed key storage is illustrated. System 100 includes a requesting device 104. Requesting device 104 may be any computing device as described below in reference to FIG. 6. Requesting device 104 may be included in any computing device as described below in reference to FIG. 6. Requesting device may include a single computing device operating independently, or may include two or more computing devices operating in concert, in parallel, sequentially or the like; two or more computing devices may be included together in a single computing device or in two or more computing devices. Requesting device may be an element of, be in communication with, or otherwise utilize a secure computing module as described below in further detail. Requesting device may be or include a distributed storage node as described below in further detail.

Still referring to FIG. 1, requesting device 104 may be communicatively connected a plurality of distributed storage nodes 108. As used herein, a first device is "communicatively connected" to second device when the first device is able to send data to and/or receive data from the second device using electronic communication. Communicatively connected devices may be capable of communication via direct or indirect wired or wireless communication, including without limitation using any proprietary or standard internet protocol suite, including transfer control protocol/Internet protocol (TCP/IP), UDP, DCCP, SCTP, RSVP, QUIC or the like, may utilize additionally application layer protocols such as hypertext transfer protocol (HTTP), secure HTTP (HTTPS), file transfer protocol (FTP), Transport Layer Security (TLS), mutual TLS (mTLS), SSL, BGP, DHCP, DNS, FTP, IMAP, LDAP, MGCP, MQTT, NNTP, NTP, POP, ONC/RPC, RTP, RTSP, RIP, SIP, SMTP, SNMP, SSH, Telnet, XMPP or the like. Communication of data between first device and second device may be relayed via one or more intermediate devices on network, including without limitation modems, servers, telecommunications devices, and the like. A device may be communicatively connected to a network, as used herein, where the device is able to send data to, and/or receive data from, at least one other device connected to the network.

With continued reference to FIG. 1, requesting device and/or any distributed storage node of plurality of distributed storage nodes may include a secure computing module 112. As used herein, a secure computing module 112 is a hardware or software element configured to perform one or more secured operations beyond the control of other circuit elements or software, whether incorporated with the secure computing module 112 in a circuit or computing device, or a part of an extrinsic computing device. As a result, at least one secured operation performed by secure computing module 112 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 112 and/or a system or computing device incorporating secure computing module 112 based on the above-described set of assumptions. As a non-limiting, example, a secure computing module 112 designed to produce an expected result despite all software-only attacks may give rise to a first confidence level, whereas another secure computing module 112 designed to produce its expected result in the face of all software or hardware attacks may give rise to a second confidence level; the second confidence level may be higher, owing to the reduced probability that the second secure computing module 112 would be compromised.

Still viewing FIG. 1, secure computing module 112 may include a trusted platform module (TPM 116). In an embodiment, a TPM 116 may include a hardware module, which may be an integrated circuit, an optoelectronic circuit, a section of an integrated circuit on the same die as a requesting device, an integrated circuit packaged with other die in a multi-chip module or other multi-die integration method, or printed circuit board product; TPM 116 may have any suitable elements of digital or analog circuitry usable to perform one or more processes as described herein, including without limitation processes used to determine confidence levels and/or authenticate digitally signed assertions as described below. TPM 116 may have memory and/or other logic and/or a requesting device in its own right which may be in a non-limiting example a crypto-requesting device. TPM 116 may have a hard-coded process for signing a digital signature, which may be performed using a private key, which is associated with a public key. TPM 116 may be configured to incorporate a secure enclave and protocols for performing attestation on behalf of an untrusted or less trusted hardware or software element, e.g. TPM 116 may be configured to have attestation requests from such a less trusted element relayed to it for secure signing, and may include packaging of signed data for use in an attestation protocol, representative embodiments of which are included in this disclosure. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices. Where an element being "signed by PUF" and/or "generated by a PUF," as used herein, may include any PUF-backed and/or derived key generation or the like as described herein.

With continued reference to FIG. 1, secure computing module 112 may include at least PUF 120. PUF 120 may be implemented by various means. In an embodiment, PUF 120 includes one or more non-intrinsic PUFs. Non-intrinsic PUFs may include without limitation optics-based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics-based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay-based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 120 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 120 in an embodiment include without limitation buskeeper PUFs, which may be similar to other PUFs based on bistable memory elements but leveraging buskeeper cells. PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

Continuing to view FIG. 1, PUF 120 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFs may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF response. In each case, the PUF circuit element producing the variable signal may be connected to an analog to digital converter, comparator, or similar element to produce one or more output bits.

In an embodiment, and still viewing FIG. 1 PUF 120 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 120 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single microcavity PUF. Alternative or additional non-linear photonic devices may be used to implement a photonic PUF.

Further viewing FIG. 1, other examples of PUF 120 that may be used may include, without limitation, nano-electromechanical (NEM) PUFs. NEM PUFs may include PUFs that leverage stiction of a silicon nanowire to a binary gate structure. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 120 and/or TPM 116; such outputs may be used to generate symmetric or asymmetric keys, private keys, zero-knowledge proofs, secure proofs, digital signatures or other proofs of authenticity, as described in further detail below.

Continuing to refer to FIG. 1, secure computing module 112 may implement one or more secure memory storage protocols. One or more secure memory storage protocols may be protocols designed to prevent unauthorized access to memory and/or to protect secure computing module 112 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 112. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 112 may incorporate a memory controller located within the trusted computing boundary to encrypt and authenticate by secret key memory elements such as without limitation memory page tables and/or memory pages accessible by other software elements, such as an operating system. Various techniques, processes, means or elements may be used to implement the above-described secure memory protocols. For instance, secure computing module 112 may use hardware-enabled access control to protect memory access; hardware access control may, as a non-limiting example, be performed by tagging each memory entry with a "container identifier" corresponding to a page, file, or other grouping of memory, enabling secure computing module 112 to determine whether tampering has occurred.

Secure computing module 112 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 112 may operate using one or more dedicated memory objects, registers, or storage elements; as a non-limiting example, secure computing module 112 may operate with dedicated cache lines not available to other processes or circuits, preventing, e.g., stack or buffer overrun attacks to corrupt or steal data. Dedicated memory elements may be wired only to secure computing module 112; access to dedicated memory elements may be rendered impossible except by way of secure computing module 112. Secure computing module 112 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 112 may utilize oblivious random access memory (RAM) wherein memory access patterns are obfuscate to prevent detection of memory access patterns by outside observers attempting to deduce execution details regarding processes performed using secure computing module 112 Secure computing module 112 and/or device incorporating secure computing module 112 may incorporate a trusted non-volatile storage device that provides some means of verification of secure storage capability and other properties. Memory protocols as described above may be used to implement methods of attested storage and the chain of trust beginning at PUF 120 level up through requesting device, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 112.

Still referring to FIG. 1, secure computing module 112 may include a secure requesting device. Secure requesting device may be a requesting device as described below in reference to FIG. 5. Secure requesting device may operate autonomously from other requesting devices and/or an operating system operating on at least a distributed storage node; for instance, secure requesting device may store entries in temporary or long-term memory in encrypted form, where decryption is impossible without private keys not available to devices, circuits or software besides secure requesting device. Encryption may likewise be impossible without private keys available only to secure requesting device. Secure requesting device may also digitally sign memory entries using, for instance, a private key available only to secure requesting device. Keys available only to secure requesting device may include keys directly encoded in hardware of the secure requesting device; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure requesting device. Secure requesting device may be constructed, similarly to TPM 116, to frustrate alteration and/or probing to discover and/or alter private keys. Private keys may be demonstrable as uniquely associated with secure requesting device by use of PUF 120 as described above; secure requesting device may include, for instance, a TPM 116 as described above. Alternatively or additionally, a certificate authority as described above, which may be a manufacturer of secure requesting device, may verify that one or more public keys are associated uniquely with secure requesting device according to any protocol suitable for digital certificates.

With continued reference to FIG. 1, secure computing module 112 may implement one or more methods of attested computation. Attested computation may include or involve one or more methods to ensure that computation of a program, known as an attested program, is trusted and signed by secure computing module 112 and/or computing device incorporating secure computing module 112; this may be supported by means to assert the state of the system memory, code, and input data. In an embodiment, secure computing module 112 and/or a computing device incorporating secure computing module 112 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 112 and/or computing device incorporating secure computing module 112 may append a cryptographic signature based upon any private key that may be associated with secure computing module 112 as described herein. Secure computing module 112 and/or computing device incorporating secure computing module 112 may operate a security reset of working memory prior to load of data for trusted computation; for instance, the secure computing module 112 and/or computing device incorporating secure computing module 112 may append a hash of the memory to cryptographic hash of system state following reset and prior to loading data. Secure computing module 112 and/or computing device incorporating secure computing module 112 may append its authentication signature of memory page tables and/or memory tables. Upon completion of the trusted computation, which may include execution of program code of system state, secure computing module 112 and/or computing device incorporating secure computing module 112 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 112. Secure computing module 112 and/or computing device incorporating secure computing module 112 may include a system to compute one or more hash trees of cryptographic hash of the computation, system state, and/or outputs; secure computing module 112 and/or computing device incorporating secure computing module 112 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of secure computing module 112s may include, without limitation, a TPM 116 as described above. Secure computing module 112 may include a TPM 116 combined with a boot-measuring protocol using hash trees, Merkle trees, or the like to measure boot entries to create an "attested boot." Secure computing module 112 may include a trusted execution technology (TXT) module combining TPM 116 with establishment of a secure container at run-time; secure container may be isolated from a software stack and OS of at least a temporal attester 104 and/or use TPM 116 to measure and attest to secure container prior to launch. Secure computing module 112 may include execute-only memory (XOM). Secure computing module 112 may include an Aegis requesting device. Secure computing module 112 may include a Bastion requesting device. Secure computing module 112 may include a trusted execution environment (TEE) or enclave, such as that enabled by SOFTWARE GUARD EXTENSIONS (SGX) system as promulgated by Intel Corporation of Santa Clara, Calif. Secure computing module 112 may include a Sanctum requesting device based on RISC V architecture. Secure computing module 112 may include an Ascend secure infrastructure. Secure computing module 112 may include a Ghostrider secure infrastructure. Secure computing module 112 may include an ARM TrustZone. Secure computing module 112 may include a Trusted Little Kernel (TLK) as promulgated by Nvidia Corporation of Santa Clara, Calif. Secure computing module 112 may include Secure Encrypted Virtualization (SEV) as promulgated by Advanced Micro Devices, Inc. of Santa Clara, Calif. Secure computing module 112 may include silicon root of trust such as OpenTitan as promulgated by the LowRISC Foundation of Cambridge, UK. Secure computing module 112 may include a Titan chip as promulgated by Google of Mountain View, Calif., USA. Secure computing module 112 may include an Azure Sphere MCU and/or Microsoft Pluton as promulgated by Microsoft of Redmond, Wash., USA.

Secure computing module 112 may include an iLO subsystem as promulgated by Hewlett Packard Enterprise of San Jose, Calif. Persons skilled in the art, upon reviewing the entirety of this disclosure, will be aware of various additional or alternative trusted computing processes that may be used to implement secure computing module 112 as disclosed herein. System 100 may incorporate or communicate with a certificate authority.

Still referring to FIG. 1, secure computing module 112 may include a secure processor 124. Secure processor 124 may be a processor as described below in reference to FIG. 6. Secure processor 124 may operate autonomously from other processors and/or an operating system operating on at least a distributed storage node; for instance, secure processor may store entries in temporary or long-term memory in encrypted form, where decryption is impossible without private keys not available to devices, circuits or software besides secure processor. Encryption may likewise be impossible without private keys available only to secure processor 124. Secure processor 124 may also digitally sign memory entries using, for instance, a private key available only to secure processor 124. Keys available only to secure processor 124 may include keys directly encoded in hardware of the secure processor 124; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 124. Secure processor 124 may be constructed, similarly to TPM 116, to frustrate alteration and/or probing to discover and/or alter private keys. Private keys may be demonstrable as uniquely associated with secure processor 124 by use of PUF 120 as described above; secure processor 124 may include, for instance, a TPM 116 as described above. Alternatively or additionally, a certificate authority as described above, which may be a manufacturer of secure processor, may verify that one or more public keys are associated uniquely with secure processor according to any protocol suitable for digital certificates.

Still referring to FIG. 1, requesting device 104 may be configured to perform any method and/or method steps as disclosed herein, in any order and with any degree of repetition including without limitation performance of secure proofs, storage tasks, authentication tasks, or the like. As a non-limiting example, requesting device 104 may be configured to receive at least a confidential datum, select at least a distributed storage node of a plurality of distributed storage nodes, generate at least a retrieval authentication datum, and transmit the at least a confidential datum and the at least a retrieval authentication datum to the at least a distributed storage node. Requesting device 104 may also be configured to select at least a distributed storage node of a plurality of distributed storage nodes by receiving a storage node authorization token from the at least a distributed storage node 108, querying an instance of a distributed authentication listing containing authentication information using at least a datum of the storage node authorization token, retrieving an authentication determination from the instance of the authentication listing, and selecting the at least a distributed storage node 108 as a function of the authentication determination. In an embodiment, requesting device 104 may act as a distributed storage node 108. In an embodiment, the functionality of a requesting device selecting at least a distributed storage node of a plurality of distributed storage nodes or any other function described above may be performed via an intermediary requesting device.

With continued reference to FIG. 1, any distributed storage node 108 of plurality of distributed storage nodes 108 may be configured to perform any method and/or method steps as disclosed herein, in any order and with any degree of repetition including without limitation performance of secure proofs, storage tasks, authentication tasks, or the like. As a non-limiting example, distributed storage nodes 108 may be configured to store at least a confidential datum and a retrieval verification datum, obtain a retrieval token from a requesting device 104, authenticate requesting device 104 as a function of the retrieval token, and generate an output as a function of the confidential datum. In an embodiment, any distributed storage node 108 can act as a requesting device 104; likewise, any device that acts as requesting device 104 may also be able to act as a distributed storage node 108.

Figure 2:
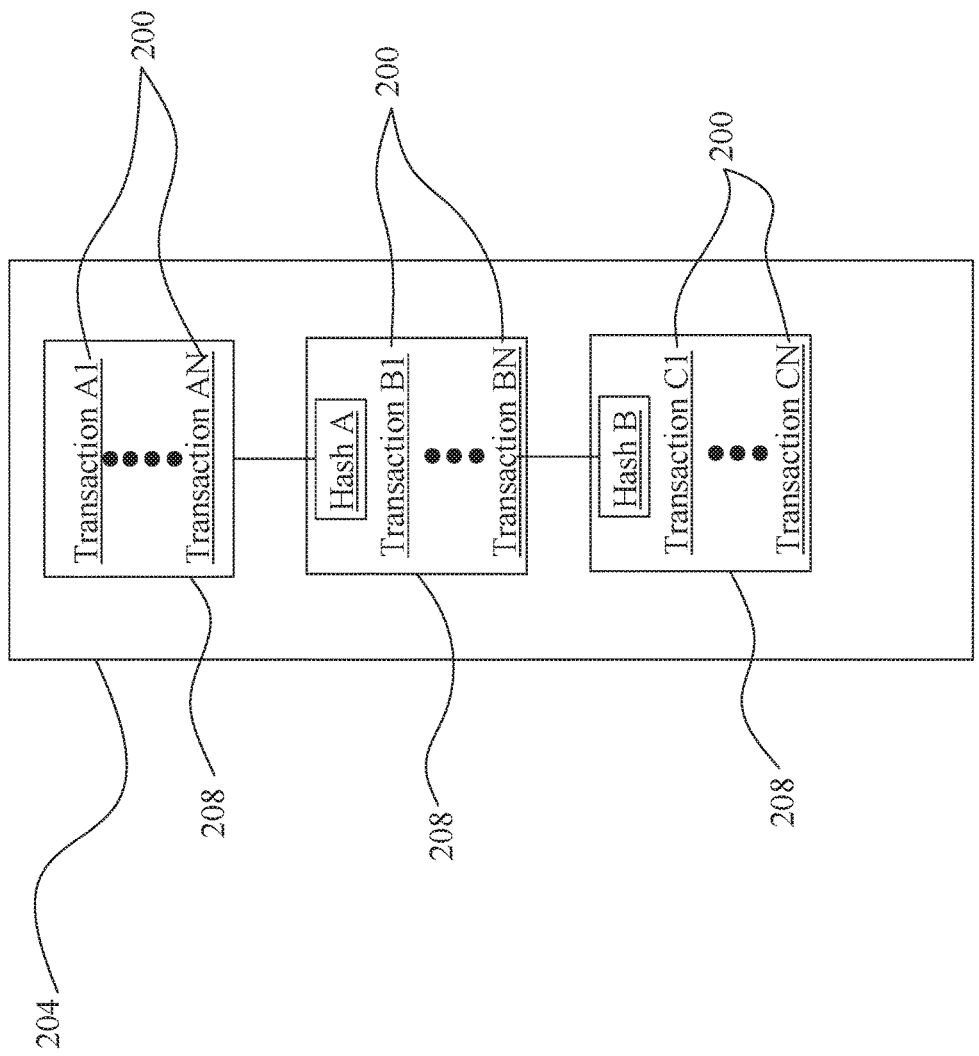
FIG. 2 is a block diagram of an exemplary embodiment of a temporally sequential listing.

Referring now to FIG. 2, system 100 may be used to perform one or more processing steps necessary to create, maintain, and/or authenticate at least a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of control, tenancy, or permission to utilize a hardware or software resource, in non-limiting examples access to a virtual machine, software container e.g. a Docker container as promulgated by Docker, Inc. of San Francisco, Calif., or a Kubernetes container as promulgated by the Cloud Native Computing Foundation, software application, function, in nonlimiting example a "function as a service", a software microservice, and the like. A resource may be a physical machine e.g. a ride share vehicle or any other asset. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a distributed storage node as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. Textual data associated with a digitally signed assertion 200 may include data attributing a cost function to a user. For example, either as part of the datum itself or by nature of the temporally sequential listing 204 in which it is stored, system 100 may enable the metering of cost for use of a resource to at least a user. In non-limiting example, a cost per unit time, service level, energy, effort, or other consumption may be associated with a property of the at least a digitally signed assertion 200. At least a requesting device may be configured with permissions to query the at least a digitally signed assertion 200 and/or temporally sequential listing 200 and determine the costs owed by a particular user or users. In an embodiment, the ledger balance of a resource, e.g. a virtual currency in nonlimiting example a cryptocurrency, may be updated accordingly as part of the temporally sequential listing. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, digitally signed assertion 200 and/or temporally sequential listing 204 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given digitally signed assertion 200.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. In an embodiment, the temporally sequential listing may be a directed acyclic graph (DAG), in which multiple branches may be generated on or by different devices implementing temporally sequential listing 204, and branches may be merged into one another, while a hash chain or similar structure ensures that branches cannot go "back in time" whether merged or not; secure timestamps and/or attested time may be further included to impose a temporal order on a DAG or other temporally sequential listing 204. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger, but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory elements besides a temporally sequential file, including without limitation any temporary or persistent memory as used in or by any computing device as described below in reference to FIG. 6. For example, and without limitation, at least a digitally signed assertion 200 may include one or more encrypted or otherwise secured or partitioned memory entries as entered for instance using a secure computing module 112 or according to a secure computing protocol as described in further detail below.

Referring again to FIG. 1, in some embodiments, secure computing module 112 and/or distributed storage node may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator, MEMS oscillator, or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 116, man in the middle or other attacks.

Still referring to FIG. 1, one or more storage nodes of plurality of distributed storage nodes 108 may include a distributed storage instance 128. A distributed storage instance, as used herein, may include any locally stored portion or copy of a data structure used in distributed storage. Distributed storage instance 128 may include a copy of a temporally sequential listing 204, one or more sub-listings 208, and/or a reference to a temporally sequential listing 204 or sublisting 208; distributed storage instance 128 may include a sufficient link to or portion of temporally sequential listing 204 to permit a distributed storage node 108 including distributed storage interface 128 to participate in one or more protocols for generating or recording digitally signed assertions 200, creating sub-listings 208, and/or authenticating digitally signed assertions 200, sublistings 208, and or temporally sequential listing 204 as describe above. Distributed storage instance 132 may include a local portion or link to any suitable distributed storage data structure, including without limitation a distributed hash table or the like.

With continued reference to FIG. 1, system 100 may include one or more verifying nodes 132. A verifying node of one or more verifying nodes 132 may be a computing device that generates authorization tokens, such as storage node authorization tokens. Verifying node may generate an authorization token solely or in combination with one or more other verifying nodes; for instance, a plurality of verifying nodes 132 may combine to generate an authorization token using threshold cryptography, multisignature, consensus based mechanism, any combination thereof, or other method as may be apparent to one of ordinary skill in the art upon reviewing the entirety of this disclosure. A verifying node may be any device suitable for use as a requesting device 104 and/or distributed storage node 108. One or more verifying nodes 132 may include one or more computing devices having a very high associated confidence level as defined above; one or more verifying node 132 may, for instance, include a secure computing module 112, which may contain elements performing extremely reliable device identification and authentication methods. Secure computing module 112 of a verifying node 132 may produce secure proofs that are authenticated or vouched for by manufacturers, rendering provenance and possession of verifying node 132 more transparent to users and devices in system 100. Secure module may identify verifying node 132 as belonging to an institution, person, or entity having a high degree of trustworthiness regarding system 100; high degree of trustworthiness may be established by identification of entity as one subject to regulation, such as a bank, or one having a significant stake in proper functioning of system 100, such as a large amount of virtual currency within system whose value and usability depend on overall system integrity. Selection of verifying node 132 may be performed by one or more distributed storage nodes 108 according to any methods described below for establishment of confidence levels in a node. A verifying node 132 may also be a distributed storage node 108. Verifying node 132 may be recorded or otherwise identified in a distributed authentication listing instance 136, as described in further detail below. Methods and systems for implementation of verifying nodes 132, authorization tokens such as storage node authorization token, a distributed certificate authority, and related topics are further described in Provisional Application No. 62/758, 367.

Any device in system 100, including any device of requesting device 104, plurality of distributed storage nodes 108 and/or one or more verifying node 132, may include an instance of distributed authentication listing instance 136. Distributed authentication listing instance 136 may be a distributed data structure containing data entries usable to store, verify, or authenticate retrieval tokens, verifying nodes 132, authorization tokens such as storage node authorization tokens, device identities, device group identities, confidence levels in devices, groups of devices, transactions, and/or other elements of system 100. Distributed authentication listing instance 136 may include any suitable listing of records identifying devices; distributed authentication listing instance 136 may include a temporally sequential listing 204 as described above. Distributed authentication listing instance 136 may include a list of authorization tokens as described below in more detail in reference to FIG. 4. Distributed authentication listing instance 136 may include a list of other device identifies, identifiers, and/or authentication determinations concerning them. Distributed authentication listing instance 136 may include verification data usable to verify secure proofs used in any embodiment of system 100 or methods as described herein. Distribute authentication listing 140 may include secure timestamps or other temporal information, including information of or usable to verify or authenticate a time-limited authentication lease as set forth in further detail herein. An instance of verifying node distributed authentication listing instance 136 may include a sufficient link to or portion of a temporally sequential listing 204 to permit a distributed storage node 108 including the instance to participate in one or more protocols for generating or recording digitally signed assertions 200, creating sub-listings 208, and/or authenticating digitally signed assertions 200, sublistings 208, and or temporally sequential listing 204 as describe above. Distributed authentication listing instance 136 may change frequently as devices may be authenticated or verified, and/or as nodes are authentication or verified, and as such may be updated frequently to reflect such activity; a device or group of devices updating distributed authentication listing instance 136 may update a local instance of the distributed authentication listing instance 136 and then provide the update and/or local instance to other devices in system 100. Updating of distributed authentication listing instance 136 between devices in system 100 may occur via peer to peer distributed hash table algorithm such as Chord, CAN, Tapestry, Pastry or any other distributed hash table protocol. Updating may additionally or alternatively utilize any means to distribute a state machine or data structure across a cluster of computing systems, e.g. in non-limiting example Raft consensus algorithm, Paxos protocol in any form including multi-Paxos, Cheap Paxos, Fast Paxos and the like. System 100 may be coordinated using a leader election process as described below. One or more verifying nodes 132 may revoke one or more authorization privileges granted to requesting device 104 and/or plurality of distributed storage nodes 108. Revocation of privileges may be updated and maintained on a revocation list. A revocation list may be a part of distributed authentication listing instance 136, or it may be its own separate listing. In an embodiment, revocation list may include a sufficient link to or portion of a temporally sequential listing 204. Revocation list may be frequently updated to reflect chances in authentication status. Revocation may include a temporal attribute, and devices and/or nodes may move on and off revocation list such as after a quantifiable period of time has elapsed Persons skilled in the art, upon reviewing the entirety of this disclosure, will be aware of various suitable protocols for disseminating changes to distributed data structures among devices storing or interacting with instances thereof.

Figure 3:
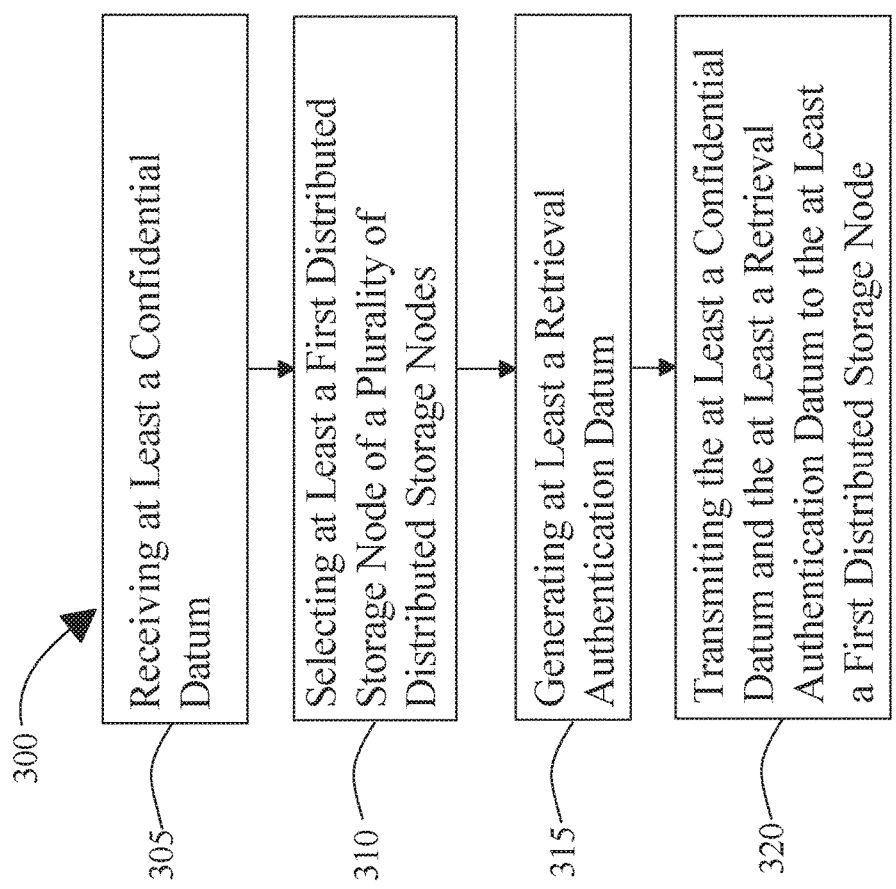
FIG. 3 is a flow diagram illustrating an exemplary embodiment of a method for distributed key storage.

Referring now to FIG. 3, an exemplary embodiment of a method 300 for distributed key storage is illustrated. At step 305, requesting device 104 receives at least a confidential datum. At least a confidential datum may be any datum that requesting device 104 seeks to have stored according to any embodiment of any method described herein. As a non-limiting example, at least a confidential datum may include at least a private key of a public key cryptographic system; at least a private key may, for instance, include a private key associated with an "address" of a cryptocurrency or other virtual currency, or with a digitally signed assertion as described above in reference to FIG. 2. At least a confidential datum may include an element of secret data usable to perform a secure proof and/or generate a verification datum as described in further detail below. At least a confidential datum may include contents of a "wallet," which user may be able to retrieve from anywhere, including using embodiments of processes or process steps described in this disclosure. At least a confidential datum may, as a further non-limiting example, include at least a user authentication datum, such as a password. At least a confidential datum may include, without limitation, a digital signature or other secure proof. Receiving at least a confidential datum may include, without limitation, receiving at least a confidential datum from another device and/or generating at least a confidential datum; for instance, where at least a confidential datum includes a key, secure proof, and/or digital signature, requesting device 104 may generate the key, secure proof, and/or digital signature according to any process or process step described in this disclosure.

Figure 4:
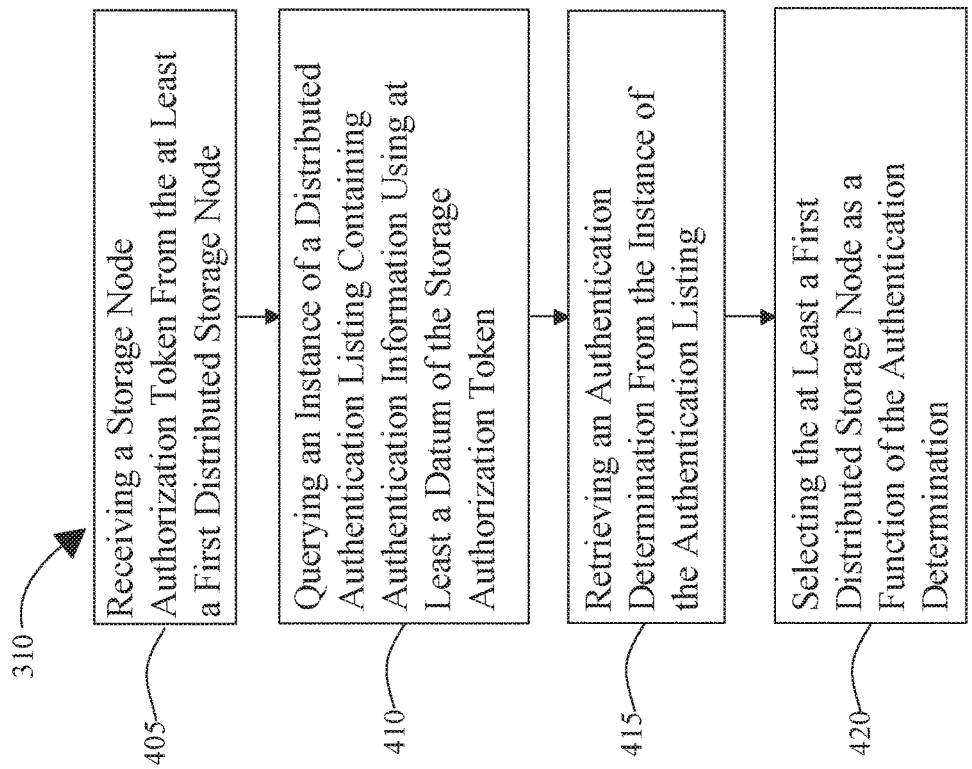
FIG. 4 is a flow diagram illustrating an exemplary embodiment of a method of selecting at least a distributed storage node of a plurality of distributed storage nodes.

At step 310, and still referring to FIG. 3, requesting device 104 selects at least a distributed storage node of a plurality of distributed storage nodes. Referring now to FIG. 4, exemplary embodiments of step 310 selecting at least a distributed storage node 108 of a plurality of distributed storage nodes 108 are illustrated. At step 405, requesting device 104 receives a storage node authorization token from the at least a distributed storage node. Storage node authorization token, as used herein, is an element of data usable to determine that at least a distributed storage node is or may be authorized to receive at least a confidential datum as described in further detail below. Storage node authorization token may be specific to at least a distributed storage node 108. Storage node authorization token may include or refer to a group identifier such as a group public key, whereby storage node authorization token may not be tied to a unique identifier of just at least a distributed storage node 108. Storage node authorization token may be a time limited token as described in more detail below, so that at least a distributed storage node 108 may need to be re-authenticated before expiration to continue performing actions as permitted by storage node authorization token. As described further below, token may include a signed timestamp and counter value, a passphrase required to decrypt messages on the network, or some combination. Storage node authorization token may include a secure proof as described above in reference to FIG. 3, generated and signed by the at least a distributed storage node 108. Storage node authorization token may include a secure proof signed by verifying node 132. In an embodiment, secure proof generated by and signed by at least a distributed storage node 108 and/or verifying node 132 may be associated with a verification datum. Verification datum as used herein, is any datum that may be used to aid in evaluation of secure proof, as described above in more detail in reference to FIG. 3. Storage node authorization token may include information contained in a listing located on distributed authentication listing instance 136.

Still referring to FIG. 4, storage node authorization token may include a secure proof generated by the at least a distributed storage node. A secure proof, as used herein, is a protocol whereby an output is generated that demonstrates possession of a secret, such as a secret stored in or produced by secure computing module 112 and/or PUF 120, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a secret, for instance as used in a single challenge-response exchange.

With continued reference to FIG. 4, secure proof may include a digital signature. In an embodiment, digital signature may be any digital signature as described above; digital signature may be created by signing a mathematical representation of first dataset. In an embodiment, at least a distributed storage node may generate a key to be used in producing digital signature using secure computing module 112. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a distributed storage node and/or secure computing module 112 may convert immediate output from PUF 120 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a distributed storage node and/or secure computing module 112 may extract one or more random numbers based on a PUF 120 output to create a symmetric key as described above. Alternatively or additionally, extraction may include extraction of a private key of a public key cryptographic system.

Still referring to FIG. 4, key extraction may include use of a number output by a PUF 120 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUT' 120; steps along a chosen elliptic curve may then be performed using random number to generate a public key. Initial point on elliptic curve and elliptic curve may be selected using additional random numbers, which may be generated using any suitable method; random numbers associated with curves having known vulnerabilities may be discarded, according to mathematical descriptors or other characteristics of such vulnerabilities as stored in memory of or accessible to at least a distributed storage node and/or secure computing module 112. Persons skilled in the art, upon reading the entirety of this disclosure, will be aware of various ways in which a random number may be used to generate a private and public key pair consistently with this disclosure.

Still viewing FIG. 4, key extraction may utilize a numerical output from a NH 120 or other element of secure computing module 112 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 120 and/or elements of secure computing module 112 may generate one or more random numbers, for instance by using one or more PUB as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUF's or other elements. Keys may be used to generate exponents for a cryptographic system such as Diffie-Helman or ElGamal that are based on the discrete logarithm problem.

Continuing to view FIG. 4, digital signature may be generated using a digital signature using a direct anonymous attestation protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 112 may act as a "first signer" of a digital signature, signing with a private key produced from a secret generator as described above. In an embodiment secure computing module 112 signs an element of data using the private key. A second signer, which may be secure computing module 112 and/or an additional element coupled thereto, may previously or subsequently sign the element of data or another element linked to the element previously signed; alternatively or additionally, second signer may use information or signature elements provided by secure computing module 112 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any interactive or non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

In an embodiment, and with continued reference to FIG. 4, secure proof may include a zero-knowledge proof, which may provide an output demonstrating possession of a secret while revealing none of the secret to a recipient of the output. Zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and still referring to FIG. 4, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup. ZK-STARKS may not rely on private-public key pairings but may rely on collision resistant hashing and a random oracle model. Collision resistant hashing may be measured if it is hard to find two inputs that hash to the same output, that is two inputs such as a and b such that H(a)=H(b), and a b. Collision resistant hash functions may include a strong one-way hash function. ZK-STARKS may utilize collision-resistant hash functions to convert a STIK into an interactive argument of knowledge system, whereby a STIK is defined as a Scalable Transparent Interactive Oracle Proof of Knowledge. A ZK-STIK may be proven to be unconditionally sound, even against computationally unbounded provers. If the STIK has perfect ZK, then the argument system has computational ZK. Any realization of a STIK using this technique may be considered interactive. Collision resistance may be desirable for example, when a party may attest to a document by publishing a public key signature on a hash of the document. A malicious actor may be able to get a party to attest to one document and then produce another document copying that attestation thereby producing the same hash and claiming the other party had attested to both documents. Collision resistance hashing may also be employed for example when parties may compare cryptographic of a file to make sure they both have the same version. A bad actor could produce two files each containing the same hash and trick users into believing they had the same version of a file when in fact they did not. ZK- STARKS may also utilize a random oracle model. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties Using the random oracle model any STIK can be compiled into a non-interactive argument of knowledge in the random oracle knowledge. If the STIK has perfect ZK then the resulting construction has computational zero knowledge. Realization of a STIK using this technique may be considered non-interactive STARK. Decisions as to whether to use interactive or non-interactive ZK-STARKS may be determined by requesting device 104 and/or system designer.

With continued reference to FIG. 4, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 4, secure proof may be generated using a physically unclonable function. For instance, and without limitation, an output of a PUF 120 may be used to generate a private key for a digital signature as described above. Alternatively or additionally, a PUF 120 output may constitute a secret to be used as a basis for a zero-knowledge proof, which may be any zero-knowledge proof as described herein.

With continued reference to FIG. 4, the secure proof generated by at least a distributed data storage node may be used to authenticate at least a distributed data storage node 108. In an embodiment, the secure proof generated may be used to demonstrate that the hardware root of trust in the at least a distributed data storage node generating the secure proof is a member of a verified manufacturer's set of devices, and that the device class to which the node is authenticated maintains a chain of attestation and software protection features enabling strong trusted enclave guarantees. These enclaves guarantee that code operated within them is privacy preserving and secure.

Still referring to FIG. 4, secure computing module 112 and/or at least a distributed storage node 108 may generate one or more elements of additional information that user or device may use to evaluate secure proof. For instance, secure computing module 112 and/or at least a distributed storage node 108 may generate a public key; public key may be provided automatically to any querying device. Alternatively or additionally, public key may be provided to a manufacturer of secure computing module 112, permitting manufacturer to act as a certificate authority for secure computing module 112. Similarly, secure computing module 112 and/or at least a distributed storage node 108 may generate data necessary to perform verification of a zero-knowledge proof by any verifier as described above.

With continued reference to FIG. 4, evaluating the secure proof may include receiving a verification datum corresponding to secure proof and evaluating the secure proof as a function of the verification datum. Verification datum, as used herein, is any datum that may be used to aid in evaluation of secure proof; for instance, where secure proof includes a digital signature generated using a private key of a public key cryptographic system, verification datum may include a corresponding public key. Similarly, where secure proof includes a zero-knowledge proof, verification datum may include verification data useable to verify zero-knowledge proof.

In an embodiment, and still viewing FIG. 4, determining identity of the at least a distributed storage node 108 may include determining identity of a at least a distributed storage node 108 using a first identification protocol and determining identity of a second distributed storage node using a second identification protocol, wherein the first identification protocol is distinct from the second identification protocol. As a non-limiting example, a at least a distributed storage node 108 of at least a distributed storage node 108 may be identified using a TTP protocol, while a second may be identified using a DAA protocol. As a further example, a at least a distributed storage node 108 may be identified using a first version of a secure computing module 112 incorporated in the first distributed storage node, while a second distributed storage node may be identified using a second version of a secure computing module 112; the first version may, for instance, be a GhostRider implementation while the second is an SGX implementation, or the like. In an embodiment, identification of distributed storage nodes 108 using heterogenous methods decreases the likelihood of an exploit successfully compromising all devices, as such an exploit would be required to take advantage of a potentially wide range of different vulnerabilities. Furthermore, in an embodiment requesting device 104 may perform a time-of-evaluation selection of identification protocols, for instance by selecting from a stored menu of protocols using a random number generator or pseudorandom number generator; this may further decrease the probability of a successful exploit.

In an embodiment, and continuing to view FIG. 4, storage authentication node may include at least a secure proof generated by at least verifying node 132. At least a secure proof generated by at least a verifying node 132 may, as a non-limiting example, include a digital signature generated by one or more verifying nodes 132; digital signature may indicate that the one or more verifying nodes 132 have determined that at least a distributed storage node is authorized to perform one or more tasks, including without limitation storing at least a confidential datum or a portion thereof as described in further detail below. At least a secure proof may be generated according to any process or procedure for generation of a secure proof as described above for generation of a secure proof by at least a distributed storage node. At least a secure proof may include a plurality of secure proofs generated by a plurality of verifying nodes; requesting device 104 may perform a threshold cryptography procedure to determine whether a number of verifying nodes required to meet a threshold of the threshold cryptography have generated secure proofs provided with storage node authorization token. At least a secure proof may sign a verification datum such as a public key associated with at least a distributed storage node, which may include a public key associated with a private key possessed by at least a distributed storage node, a verification datum associated with a secure proof that at least a distributed storage node is configured to perform, or the like. Verification datum may include a group key or other group identifier identifying a group to which at least a distributed storage 108 belongs.

With continued reference to FIG. 4, storage node authorization token may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a secure timestamp is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 4, secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 112. Additional data may include one or more additional data, including sensor data or a hash of data, that are received or generated by temporal attester. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other distributed storage nodes may evaluate confidence levels in at least a distributed storage node or other party generating secure timestamp and/or perform threshold cryptography with a plurality of such parties, each of which may have performed an embodiment of method to produce a secure timestamp. In an embodiment, distributed storage nodes or other parties authenticating first digitally signed assertion 200 may perform authentication at least in part by evaluating timeliness of entry and/or generation of first digitally signed assertion 200 as assessed against secure timestamp. In an embodiment, secure proof is generated using an attested computing protocol; this may be performed, as a non-limiting example, using any protocol for attested computing as described above.

Continuing to refer to FIG. 4, initial time of time-varying token may be recorded in or with time-varying token. As a non-limiting example, time-varying token may include an initial time, along with an identification of at least a verifying node 132, which may include any identification as described above, including without limitation a secure proof; alternatively or additionally, where time-varying token is recorded in a distributed data structure, such as without limitation distributed authentication listing instance 136, initial time may be recorded as a time of insertion of a record or lot of records including time-varying token, a time of creation or authentication of a sublisting containing time-varying token, or the like. Time-varying token may include one or more attestations from other devices in system 100; as a non-limiting example, time-varying token may include secure proofs, such as without limitation digital signatures, from one or more devices. One or more devices may include, without limitation, one or more verifying node 132; as an illustrative example, one or more verifying node 132 linked to time-varying tokens that have not yet expired may create one or more attestations included in a time-varying token linked to a device to be classified as a verifying node using one or more attestations. In other words, a community of currently verifying devices may be able to authenticate a device that is not currently verified.

Still referring to FIG. 4, in some cases it may be desirable to maintain anonymity (either anonymity of the requesting device 104 with respect to the verifying node 132, and/or anonymity of the requesting device 104 in subsequent use of the storage node authorization token on the network), while still issuing at least a verification datum. In some embodiments a resulting storage node authorization token may include a temporal attribute. To facilitate anonymity, in an exemplary embodiment of storage node authorization token in which it is desired to maintain anonymity as described above while using a storage node authorization token, the storage node authorization token may contain at least one of the following attributes: a secure timestamp indicating the time that the token was created, a monotonic counter value or other datum unique to the storage node authorization token for this particular remote device 108, and/or a session key conferring access to the network at the time of token creation. Additionally or separately, storage node authorization token may include an expiration period, e.g. a fixed time limit relative to the verifier's local time the token was created or issued and may include at least a trust level based upon the properties of requesting device 104 attested in the authentication process, as described herein. It may be desirous to separately or additionally provide at least a session key enabling requesting device 104 to encrypt and/or decrypt messages to at least a second requesting device 104, at least a distributed storage node 108, or at least a group of requesting devices 104 and/or distributed storage nodes 108, based on properties of commonality between devices. In non-limiting example, session key may be a symmetric key conveyed via secure channel from the at least a verifying node 132, and/or an asymmetric key, multi-signature, threshold signature or key system resulting from multi-signature or threshold signature as described above, or other key system or datum associated with at least a verifying node 132 during at least a time epoch. The foregoing may be signed in whole or in part, or any logical combination, by the at least a verifying node 132. In an embodiment, the at least a verifying node 132 may share via secure channel a copy of or subset of the distributed authentication listing verifying node, and additional parameters including at least a secret, in order for the requesting device 104 to evaluate storage node authorization token credentials of another device as being contained or represented in the distributed authentication listing instance 136.

With continued reference to FIG. 4, receiving a storage node authorization token may include a time-limited authentication lease serving to speed up transactions by authenticating a node, such as requesting node 104, at least a distributed storage node 108, or other device participating in system 100, during the pendency of the lease and resolving inefficiencies of peer-to-peer transactions and ad hoc authentication, and to prevent spoofing; time-limited lease may be implemented using, or may include, a time-varying token. A time-limited authentication may speed up transactions by implementing a one-time authentication for the duration of the lease as opposed to having each interaction with the node needing to be authenticated. In an embodiment, authenticating a node and/or other device using time-limited authentication lease involves checking that the lease is valid, thereby avoiding having to perform a direct anonymous attestation and/or generate secure proof; checking that the lease is valid may include determination that a time limit associated with time-limited token has not expired, as well as evaluating any secure proof included in time-limited authentication lease. A time-limited authentication lease as used herein may include a time limited token indicating that a particular node has been authenticated and verified by trusted nodes on the network. A time-limited token may serve to inform other nodes on the network that a particular node need not be re-authenticated for the duration of the validity of the lease (i.e. until a time limit of a time-limited token included or associated with the lease has expired). This may help in reducing authenticating and verification time and thus reduce overall transaction time by reducing the number of calculations that need to occur. Use of time-limited authentication lease may protect against spoofing by authenticating nodes for a set duration in time. By authenticating nodes for a set duration in time this may reduce chances that a malicious node may try to join the network and corrupt nodes by spoofing, for example. This may be of particular importance in smaller networks in which nodes regularly leave and enter other networks or reenter networks. A length of a time-limited authentication lease may depend on network parameters and may also depend on the physical and software security of a given node type. In an embodiment, a time-limited authentication lease may be implemented using a network lease key that is rotated every lease epoch (where a lease epoch may be a synchronized period in which a given network lease key is valid across system 100, by reference to an accepted set of temporal data, such as secure timestamps, timestamp hash chains, and/or single or distributed timestamp authorities as described in further detail below), thereby ensuring that software compromises to the lease key cryptography do not persist beyond a given epoch. A time-limited authentication lease may include a base name in a modification of a direct anonymous authentication scheme. In an embodiment, the lease key may be authenticated by known verifiers, which may be nodes that function to authenticate lease keys. To mitigate vulnerabilities arising from compromised nodes being able to corrupt a network, verifying nodes may be held to specific standards. Standards may include that verifiers may be selected at random, and verifiers may produce threshold signatures. For example, multiple randomly chosen verifiers may authenticate a new node within a specific window of time, verifier selection may be subjected to random audits, and mechanisms may be in place to audit a chain of authentication. For example, an audit of what nodes authenticated a given node may be performed to ensure that malicious attacks such as spoofing have not occurred.

With continued reference to FIG. 4, a temporal attribute such as a time limit, may be based on the confidence level of at least a distributed storage node 108. Confidence level may be calculated and assigned to at least a distributed storage node 108 as previously discussed above in reference to FIG. 3. Confidence level, as an indication of trustworthiness and/or robustness to compromise by malicious actors of at least a distributed storage node 108, may impact a temporal attribute of the storage node authorization token. For example, a at least a distributed storage node 108, having a high confidence level, thereby indicating a very trustworthy at least a distributed storage node 108, may be granted a time-varying token with a longer time limit than a at least a distributed storage node 108 that has a very low confidence level, and is not a trustworthy at least a distributed storage node 108.

Still viewing FIG. 4, requesting device 104 and/or a verifying node 132 may determine a confidence level at least a distributed storage node 108; assigning the at least a confidence level may include assigning the at least a confidence level as a function of the at least a confidence level. Determination of confidence level may include, without limitation, determination of a confidence level in an identity of at least a distributed storage node 108, where identity may include a device identity such as without limitation a secure proof and/or verification datum linked to a specific device, or may include a group identity such as a secure proof or verification datum associated with a group of devices according to a DAA protocol or other protocol for association of a group of devices with a group identity or public key. Confidence level in identity may be computed, for instance, using one or more statistical measures of reliability of the identification method used; for instance, a user may enter an instruction on requesting device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise assigning a confidence level as a function of the confidence level in the identity. Requesting device 104 may also determine confidence level in identity as a function of, for instance, one or more algorithms collecting statistics concerning degree of accuracy in past iterations of method 300 of a particular process for identifying at least a distributed storage node.

With continued reference to FIG. 4, at least a confidence level may include a single confidence level assigned to a single distributed storage node 108, a plurality of confidence levels assigned to a plurality of distributed storage nodes 108, an aggregate confidence level of a plurality of distributed storage nodes 108, or any other single or plural confidence level as described herein. Assigning a confidence level may include evaluating at least a digitally signed assertion signed by at least a distributed storage node 108 and assigning a confidence level to the distributed storage node 108 as a function of the evaluation of the at least a digitally signed assertion. At least a digitally signed assertion may be identified as signed by at least a distributed storage node using any identification process or protocol as described above. In an embodiment, at least a digitally signed assertion may be incorporated in a temporally sequential listing of digitally signed assertions. For instance, where temporally sequential listing is a blockchain or similar data structure, each assertion may be included in the blockchain. At least a second digitally signed assertion may include a plurality of digitally signed assertions. For instance, at least a distributed storage node 108 and/or one or more verifying nodes 132 may record a series of entries and/or digitally signed assertions in a distributed data structure, distributed authentication listing instance 136 and/or in a temporally sequential listing; each transaction of the series of transactions may be authenticated by any process suitable for authenticating any such entries and/or digitally signed assertions. As a further non-limiting example, at least a distributed storage node 108 and/or one or more verifying nodes 132 may enter an initial digitally signed assertion attesting to one or more elements of identification and/or authentication, including without limitation attestation of manufacturing date of at least a distributed storage node and/or secure computing module 112, identities, serial numbers, versions, or make of hardware components of at least a distributed storage node 108 and/or secure computing module 112, or the like. Transactions performed by at least a distributed storage node 108 may be scored according to authenticity; for instance, trusted status may be conferred on at least a distributed storage node 108 only if a certain number of authenticated transactions have been performed by at least a distributed storage node 108, a certain amount of value has been conveyed in authenticated transactions by at least a node, a certain proportion (which may be 100%) of transactions performed by at least a distributed storage node 108 have been successfully authenticated, or any other suitable benchmarking and/or scoring process or combination thereof. At least a digitally signed assertion may include assertions that were recorded in rejected instances of a temporally sequential listing 204, such as rejected forks; in an embodiment, confidence level may be reduced as a function of a number of rejected forks including assertions signed by at least a distributed storage node, for instance.

Still referring to FIG. 4, assigning the at least a confidence level may include receiving a consensus evaluation of the at least a confidence level from a network of distributed storage nodes 108 and/or verifying nodes 132. For instance, all distributed storage nodes 108 and/or all verifying nodes 132 currently connected to network and/or representing a sufficient number of devices to achieve a threshold required in a threshold cryptography process may determine a confidence level concerning a particular distributed storage node. This determination may be performed, for instance, by authenticating one or more current or past instances of a temporally sequential listing 204 and/or one or more sub-listings 208 thereof. Determination may include identification of one or more rejected instances of temporally sequential listing 204. Each distributed storage node 108 of plurality of distributed storage nodes 108 and/or verifying nodes 132 may provide a confidence level for the distributed storage node 108 to be evaluated. Requesting device 104, another requesting device communicatively connected to network, and/or one or more verifying nodes 132 may calculate an aggregate confidence level based on confidence levels submitted by plurality of distributed storage nodes and/or one or more verifying nodes 132; aggregation may be performed according to any method for aggregation of confidence levels described above. In an embodiment, aggregation may be weighted according to a previously determined confidence level of each distributed storage node 108 of plurality of distributed storage nodes 108 and/or of each verifying node 132 of plurality of verifying nodes 132 performing consensus determination of confidence level of distributed storage node to be evaluated. This may include, e.g., ignoring confidence level submissions from devices having confidence levels below a certain threshold; alternatively or additionally, requesting device 104 may request confidence level determinations by a plurality of devices previously determined to have a confidence level above a certain threshold level, and/or a plurality of verifying nodes 132. Each distributed storage node 108, verifying node 132, and/or other device participating in consensus determination of confidence level may perform any action described herein for determining a confidence level, or any combination of such actions.

With continued reference to FIG. 4, assigning the at least a confidence level may include evaluating a digitally signed assertion and/or entry in distributed authentication listing instance 136 assigning a recorded confidence level to a distributed storage node 108 of the at least a distributed storage node 108, and assigning the confidence level as a function of the recorded confidence level. Digitally signed assertion may be any digitally signed assertion as described herein. Digitally signed assertion may be included in distributed authentication listing instance 136, any distributed data structure, and/or any or temporally sequential listing as described herein; distributed authentication listing instance 136, any distributed data structure, and/or any or temporally sequential listing as described herein may include a entries relating identifiers of distributed storage nodes to confidence levels, where identifiers may be any data usable as identifiers as described herein. Assignment of confidence level may be performed as a function of identifier; that is, identifier may be linked to an identity of a distributed storage node 108, which may be used for assignment of confidence level as described in this disclosure. Requesting device 104 may receive an instance of distributed authentication listing instance 136, any distributed data structure, and/or any or temporally sequential listing as described herein; receiving may include receiving an entire copy of the instance, receiving a sub-listing or other portion, receiving a link to distributed authentication listing instance 136, any distributed data structure, and/or any or temporally sequential listing as described herein, or a portion thereof, stored remotely, receiving digitally signed assertion along with an indication of distributed authentication listing instance 136, any distributed data structure, and/or any or temporally sequential listing as described herein containing digitally signed assertion, or the like. As a non-limiting example, one or more requesting devices, a consensus process, requesting device 104, one or more verifying nodes 132, and/or a network of distributed storage nodes 108 having a confidence level in excess of a threshold, may have previously evaluated a confidence level in a certain distributed storage node; in an embodiment, such a confidence level may itself be recorded in an assertion listed in distributed authentication listing instance 136, any distributed data structure, and/or any or temporally sequential listing 204. A plurality of such assertions, corresponding to a plurality of distributed storage nodes 108, may be listed; as such, requesting device 104 may determine confidence level in one or more distributed storage nodes solely by retrieving confidence levels so recorded. Alternatively or additionally, requesting device 104 may combine such confidence levels with confidence level determinations made by other means. Combination may be performed, e.g., by retrieving such confidence levels from distributed authentication listing instance 136, any distributed data structure, and/or any or temporally sequential listing 204 for at least a distributed storage node 108 and calculating a confidence level for at least a second distributed storage node 108 by any other process described above. As a further example, requesting device 104 may retrieve a confidence level recorded in distributed authentication listing instance 136, any distributed data structure, and/or any or temporally sequential listing 204 for a given distributed storage node, determine a confidence level for the same distributed storage node, and then aggregate the two confidence levels according to any process as described above for aggregation of confidence levels.

Still referring to FIG. 4, requesting device 104, or other device determining confidence level, may further weight or modify confidence level according to one or more additional factors. For instance, confidence level may be weighted according to how recently distributed storage node signed a digitally signed assertion and/or entry in an authenticated instance of distributed authentication listing instance 136, any distributed data structure, and/or any or temporally sequential listing 204, where a more recently authenticated assertion and/or entry may result in a higher confidence level or higher weight assigned to the confidence level, and a less recently authenticated assertion may result in a lower confidence level or a lower weight assigned to that confidence level. As another example a distributed storage node 108 that has recently "sold off" a large amount of value and/or has an assertion in a sub-listing 208 currently awaiting authentication may have its confidence level decreased. As a further example, a device with little or no history, or an anonymous device, may be assigned some minimal or "neutral" confidence level indicating treatment as a "consensus" device rather than a "trusted" device. A device associated with a previous fraudulent transaction may be assigned a confidence level of zero or may be excluded from evaluation processes.

With continued reference to FIG. 4, assigning the at least a confidence level may include performing a trusted time evaluation of at least an action performed by the at least a distributed storage node. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via DAA or an authorization token provided by at least a verifying node 132) to verify that the secure computing module 112 is an authentic secure computing module 112 that has the property of attested time.

With continued reference to FIG. 4, temporal attribute and/or token containing the temporal attribute may be available for other devices and/or verifying nodes 132 to view. In an embodiment, the temporal attribute and/or token containing the temporal attribute may be linked to the storage node authorization token. In an embodiment the storage node authorization token may include a public key of a cryptographic system. In such an instance, other devices on the network may be able to access the public key and view both the duration of the storage node authorization token and how recently the storage node authorization token was generated. In an embodiment, the temporal attribute and/or token containing the temporal attribute may be linked to requesting device 104 and may be stored on a temporally sequential listing. Other devices and/or verifying nodes 132 may have access to the temporally sequential listing and may be able to view the storage node authorization token of requesting device 104. Storage node authorization token may further include or be associated with a confidence level that at least a verifying node 132 has associated with at least a distributed storage node 108 as described above. In an alternative embodiment where the specifics of time remaining on a storage node authorization token may be undesirable to expose, e.g. when such information may aid malicious actors in preferentially targeting a particular requesting device 104, storage node authorization token, in the open or via shared cryptographic key specific to authenticate devices or a subset of authenticated devices, may simply indicate whether or not the storage node authorization token is valid at time of inquiry. It may be desirable to limit the number of requests for validity of a storage node authorization token, e.g. to avoid exposing information that may aid malicious actors in preferentially targeting a particular requesting device 104.

With continued reference to FIG. 4, at step 410, requesting device 104 queries an instance of a distributed authentication listing containing authentication information using at least a datum of the storage node authorization token. Authentication listing may be reflected in distributed authentication listing instance 136 and may be frequently updated to reflect changes in device, and/or node authentication status. Distributed authentication listing instance 136 may be also updated to remove a device and/or node after expiration of a time varying storage node authorization token. In an embodiment, requesting device 104 may query an instance of a distributed authentication listing using at least a datum of the storage node authorization token by comparing a hash generated of the storage node authorization token and comparing it to a hash located on distributed authentication listing instance 136. Hashes that are analogous may indicate authentication can move forward. Entries in distributed authentication listing instance 136 may include authentication determinations; as used herein, an authentication determination is an entry in distributed authentication listing instance 136 establishing identity, group identity, authentication, authorization, status as a verifying node 132 and/or confidence level of a device or group of devices in system 100. For instance, an authentication determination may include a verification datum associated with a verifying node 132, potentially with one or more secure proofs indicating conference on verifying node 132 of its status by one or more other devices such as other verifying nodes, such that a secure proof in storage authentication token generated by verified node 132 may be determined to have been issued by a verified node 132. An authentication determination may include a verification datum associated with at least a distributed storage node 108 and/or a group including at least a distributed storage node 108, which may in turn be signed by one or more verifying nodes 132 with an entry one or more authorization and/or authentication rights granted to an associated device; as a result, storage authentication token may consist only of a secure proof issued by at least a distributed storage node 108, which may be verified and associated with authorization and/or authentication levels granted to at least a distributed storage node 108 by reference to authentication determination. Similarly, an authentication determination may include a time-varying property such as a time limit and/or time-varying authentication lease, which may apply either to a period of validity of authentication determination itself or of a storage authorization token associated therewith as described above.

In an embodiment, and still viewing FIG. 4, querying instance of distributed authentication listing instance 136 may be performed according to one or more protocols for efficient querying. For instance, where distributed authentication listing instance 136 is temporally sequential, one or more entries therein, which may be referred to herein as "authentication determinations," may include time-varying properties, time limits, and/or time-limited authentication leases, as described above; requesting device 104 may search only entries in instance of distributed authentication listing instance 136 in which entries are recent enough not to have expired. As a non-limiting example, a maximal length of a time-limited authentication lease associated with any entry may be recorded or known in system 100 and/or distributed authentication listing instance 136, so that entries recorded longer than that maximum period prior to a current time, as determined for instance by a singular or distributed timestamp authority of the like, may be ignored by requesting device 104 and/or other devices in system 100. As a further example, where time-limited leases are granted in synchronized lease epochs, requesting device 104 or other device querying distributed authentication listing instance 136 may search only as far back as a term of a relevant lease epoch. Alternatively or additionally, one or more indices, hash tables, or other data structures or elements of data structures may be provided with distributed authentication listing instance 136 to permit querying to be performed efficiently.

With continued reference to FIG. 4, at step 415, requesting device 104 retrieves an authentication determination from the instance of the authentication listing. Authentication determination may include a secure proof as described above. Authentication determination that includes a secure proof may include a verification datum associated with the secure proof. Verification datum may aid in the evaluation of secure proof as described above. Authentication determination may include a signature generated by a verifying node 132. In an embodiment, signature may include a digital signature signifying authentication determination has been verified by verifying node 132. Authentication determination may also include an entry of verifying node 132 located on distributed authentication listing instance 136. Distributed authentication listing instance 136 may be included in a temporally sequential listing and updated to reflect changes in device status. Distributed authentication listing instance 136 may include a list containing current information regarding verifying nodes. In an embodiment, verifying nodes can move on and off distributed authentication listing instance 136. For example, a verifying node may be added to distributed authentication listing instance 136 when verifying node has been authenticated, for instance by one or more additional verifying nodes. However, verifying node may only be authenticated for a certain period of time, after which verifying node may be removed from verifying node registry, and/or entry on distributed authentication listing instance 136 may cease to be valid according to protocols described above for time-varying properties and/or time-limited authentication leases. Over time, verifying node may be reauthenticated and as such, may be added back onto distributed authentication listing instance 136. Verifying nodes that have authentication privileges revoked and/or have authentication privileges expired after a certain quantifiable period of time, may be listed on a revocation list. Retrieving an authentication datum may include authenticating one or more distributed storage nodes of at least a distributed storage node by checking the revocation list. Revocation list may be part of distributed authentication listing instance 136 or revocation list may be a separate listing. Revocation list may be included in a temporally sequential listing and may be updated frequently to reflect changes in authentication status. Authentication listing may also include a calculated confidence level of at least a distributed node. Confidence level may be calculated according to any methods as described above. In an embodiment, confidence level may indicate trustworthiness of at least a distributed storage node 108. In an embodiment, confidence level of at least a distributed storage node 108 may be required to meet a threshold level. Confidence level falling below threshold level may fail to produce an authentication listing. Confidence level that meets and/or exceeds threshold level may produce an authentication listing. In an embodiment, authentication may be performed as a function of confidence level of at least a distributed storage node 108. Confidence level may be found on distributed authentication listing instance 136. Confidence level may be obtained from storage node authorization token. In an embodiment, confidence level of a at least a distributed storage node 108 may include an access level that determines if access to storage node authorization token will be granted. For example, at least a distributed storage node 108 that has a very low confidence level, indicating a greater chance of untrustworthiness may not be granted access to storage node authorization token. However, at least a distributed storage node 108 that has a higher confidence level may be granted access to storage node authorization token. Confidence level may also be calculated by verifying node 132. In an embodiment, confidence level may be calculated and/or obtained by any combination of the methods as described above.

In an embodiment, and with continued reference to FIG. 4, a verifying node 132 and/or distributed storage node 108 may determine a confidence level in requesting device 104; confidence level may be determined according to any means, method, process, and/or process step for determination of a confidence level in any distributed storage node 108 and/or verifying node 132 as described above. Confidence level may be used as an additional factor in authenticating user and/or requesting device 104. Additional factors may, for instance, be used to identify where requesting device 104 is behaving in an anomalous manner, where a device purporting to be requesting device 104 appears to have a different fingerprint, where requesting device 104 and/or device purporting to be requesting device 104 appears to be in an unexpected geographic location, and/or when such a device, either through confidence-level determination and/or device fingerprinting is matched to a device that has performed fraudulent processes or has been "blacklisted" for risky or untrustworthy behavior. In an embodiment, transaction may be refused under such circumstances, or additional authentication from user may be requested.

Continuing to refer to FIG. 4, at step 420, requesting device 104 selects the at least a distributed storage node as a function of the authentication determination. In an embodiment requesting device 140 may use authentication determination to verify a secure proof provided in or with storage node authorization token. Requesting device 104 may use authentication determination to verify that one or more devices signing or producing storage node authorization token are one or more verified devices 136. Requesting device 104 may obtain a confidence level as described above from authentication determination. Requesting device 104 may determine one or more access or authorization rights, time limits lease epochs, or the like as described above from authentication determination. In an embodiment, requesting device 104 selects at least a distributed storage node 108 only if determining, using authentication determination and/or storage node authorization token, that at least a distributed storage node 108 is currently authorized by other devices in system 100, including without limitation one or more verifying nodes 132, to store at least a confidential datum and/or a portion thereof. Selecting at least a distributed storage node 108 may include determining an identity of at least a distributed storage node 108, which may be any identity of a device or group of devices as described above. Determining identity may include, as a non-limiting example, comparing at least a datum received as an identifier, group identifier, group key, or the like from at least a distributed storage node 108 to one or more stored values; one or more stored values may be stored in a temporally sequential listing as described above. One or more stored values may be stored in a database or other data structure. Determining identity may include comparison of a digitally signed assertion and/or secure proof, as described in further detail below, in a temporally sequential listing or other data structure to a digitally signed assertion and/or secure proof received from at least a distributed storage node.

With continued reference to FIG. 4, selection of at least a distributed storage node 108 may be determined according to proximity according one or more measures of distance or time between each distributed storage node 108 and requesting device 104, between at least a distributed storage node and each selected distributed storage node 108, and/or between at least a distributed storage node 108 and requesting device 104. For instance, and without limitation, where plurality of distributed storage nodes is connected to requesting device via a network, selecting at least a distributed storage node 108 may include selecting at least a proximate distributed storage node 108 of the plurality of distributed storage nodes 108 in a graph representing the network; a proximate at least a distributed storage node on a graph, may include, for instance, a at least a distributed storage node 108 within a certain number of steps through the graph from once device to another. Steps may also be weighted according to, e.g., estimates of physical distance or length of wire between distributed storage nodes 108 connected by steps, as measured using network latency analysis and/or other processes for instance as described below. As another non-limiting example, selecting at least a distributed storage node 108 may include selecting at least a geographically proximate distributed storage node 108 of plurality of distributed storage nodes. Geographical location of requesting device 104, at least a distributed storage node 108 and/or at least a device selected as part of at least a distributed storage node 108 may be performed by analysis of IP addresses, which may be compared to stored information mapping such addresses to particular geographical locations or the like; geographical location of any devices as described above may alternatively or additionally be determined using navigational facilities, such as a global positioning system (GPS) or other protocols used to determine a location of a device. Distance between devices may be computed using this information and compared to a threshold value; a device may be selected only if distance from requesting device 104 and/or at least a distributed storage node 108 is below the threshold value, which may include, for instance, a radius of a certain number of miles or kilometers around the determined location of the requesting device 104, at least a distributed storage node, and/or another device.

With continued reference to FIG. 4, selecting at least a distributed storage node 108 may include selecting at least a temporally proximate distributed storage node 108; this may be at least a distributed storage node that under network latency analysis, time for response to a "ping" signal, or the like presents a likelihood of a more rapid response. Alternatively or additionally, past response times and/or past times in which generation of appraisals as described in further detail below was performed may be recorded in memory 108 and/or in temporally sequential listing 204; selection of at least a distributed storage node may be performed based on past performance time. Selection of distribute framework may include selection of at least a device to minimize total communication latency, where total communication latency is total expected time for each distributed storage node, or other device, to respond with an appraisal as described in further detail below; such selection may involve determining, for instance, a selection of plurality of distributed storage nodes 108 presenting an optimal or near-optimal network traversal time, which may be computed using node-count distances, geographical distances, network communication latency times, and/or expected performance times by particular distributed storage nodes 108. Such optimization may involve a near-optimal resolution of a "traveling salesman" problem, including without limitation a "greedy algorithm" in which each selection step involves choosing a locally optimal distributed storage node 108; for instance, requesting device 104 may choose a first "nearest" distributed storage node 108 as measured by any of the above metrics, including any measure of actual or path distance and/or any measure of communication or computation latency. Continuing the example, requesting device 104 may subsequently select a second distributed storage node 108 according to a locally optimal next selection under the above-described metric or metrics, selecting from locally optimal steps that either at least a distributed storage node 108, requesting device 104, either, or both may perform. This may be repeated until a desired number of distributed storage nodes 108 is selected; "desired" number may be a raw threshold number, an aggregate confidence level as described in further detail below, or the solution to another optimization problem such as optimization of confidence versus speed as described in further detail below. Alternatively or additionally, optimal selection may make use of data concerning previously performed transactions; use of such data may include selection of an acceptably rapid previous transaction or use of a plurality of previous selections to produce an algorithmic or mathematical solution to optimal selection using, e.g. a polynomial regression process, a neural-net machine learning process, or the like. Persons skilled in the art will be aware of various machine learning, deep learning, or other adaptive techniques that may be used to approach such an optimization problem, upon reviewing the entirety of this disclosure.

Still referring to FIG. 4, selection may include selection of only highly trusted distributed storage nodes 108, for instance as determined by determination of confidence levels as described above and/or by selection of verifying nodes 132, or a combination thereof, such that the fewest distributed storage nodes 108 are required for a given security requirement. These methods may be used to optimize network performance of authentication processes. In another example, additional data as described above that are incorporated into blocks or otherwise made available to nodes of the network may be utilized to optimally select which distributed storage nodes 108 are selected.

In another embodiment, and continuing to refer to FIG. 4, selecting at least a distributed storage node 108 may include establishing an aggregate confidence-level threshold determining confidence levels of one or more distributed storage nodes 108 of plurality of distributed storage nodes 108, and/or of one or more other devices that may be incorporated in at least a distributed storage node 108, aggregating the confidence levels of the one or more distributed storage nodes 112 to generate an aggregate confidence level, determining that the aggregate confidence level satisfies the aggregate confidence-level threshold, and selecting the one or more distributed storage nodes 108. Evaluation of confidence level of each of plurality of distributed storage nodes 108 may be performed as described in further detail herein. Establishment of an aggregate confidence level in a plurality of distributed storage nodes 108 or other devices having a plurality of associated confidence levels may involve, e.g., adding together confidence levels; alternatively, aggregate confidence level may be computed by viewing each confidence level as a probability, calculating an aggregate probability by averaging or other statistical combination processes, and selecting distributed storage nodes 108 or other devices so as to result in an aggregate probability representing a desired confidence level. Alternatively or additionally, a machine-learning algorithm as described above may analyze past transactions to determine an optimal mathematical operation for calculating an aggregate confidence level. As noted below, a desired confidence level to be used as a threshold may be computed in turn by reference to a user input indicating a desired confidence level, a minimal confidence level set by requesting device 104 and/or network, for instance to ensure some degree of overall network integrity, a calculation based on a value of a transaction recorded in at least a digitally signed assertion 116, or the like.

Still referring to FIG. 4, selecting at least a distributed storage node 108 may include generating a cost function of confidence level and communication latency and minimizing the cost function. In an embodiment, cost function may be selected to optimize one or more user and/or network goals. Goals to be optimized may include, without limitation, a desired degree of latency (defined herein as a speed with which at least a computational or storage task to be performed by at least a distributed storage node occurs), security (which may be defined, e.g., as a degree of confidence in the accuracy of the task, a degree of confidence in the data integrity of the task, a degree of confidence in protection from data breeches and/or theft of information, and/or a degree of confidence in faithful performance of the computation by at least a distributed storage node 108), anonymity (defined as a degree of difficulty in obtaining information concerning a user of querying device and/or a person entering a transaction on temporally sequential listing 204), and throughput (defined as an aggregate or average latency across users, distributed storage nodes 108, and or other devices). There may be tradeoffs between the above-mentioned four goals. For instance, if user wishes to perform a task rapidly, reducing the number of nodes in at least a highly trusted at least a distributed storage node may improve the speed with which authentication can take place, as may selection of proximate nodes as described above. Anonymity, however, may favor selection of more widely scattered distributed storage nodes or other devices to make it more difficult to deduce where requesting device 104 is located geographically or within network; additional measures to ensure anonymity, such as use of an anonymizing protocol such as the Tor protocol promulgated by The Tor Project, Inc., which functions by directing all internet traffic through a network containing a plurality of relays to conceal a user's location and usage from network surveillance and/or traffic analysis attempts, using "onion routing" processes, or the like may further increase latency and slow down authentication. Similarly, where greater security is a goal, selections of highly trusted devices may be maximized, and/or across a wider range of network locations and/or geographical locations to improve the likely independence of nodes, also slowing the process. Selection of greater numbers of nodes, with lesser network latency between them, may also enable greater performance or capacity in computational or storage tasks. Thus, a person or device who wants to perform a task very secretly may desire a very high degree of security and anonymity and may accept a greater degree of latency in exchange. A user or device seeking to perform a task with a high degree of security, but without a need for rapid performance or storage capacity may use a small number of highly trusted nodes. As another non-limiting example, a task may require fast, high-security, processing, relying on high degree of trust and low anonymity. As a further example, processes involving medical data may require high anonymity and high security, which may be emphasized above speed. In an embodiment, the ability of method 300 or variations thereof to modify these parameters for optimal results in different scenarios may be highly advantageous over existing methods.

With continued reference to FIG. 4, cost function may be dynamically set by a selected degree of optimization for one or more attributes. Determining degree of optimization may be performed via a user interface, which may be a graphical user interface (GUI), for instance by providing a user with one or more sliders representing desired degrees of security, transaction speeds, and/or levels of anonymity; sliders may be linked to absolute ranges of the attributes or may alternatively be used proportionally to represent relative importance to user of each attribute. Positions of one or more sliders may be reset according to stored mathematical relationships between different items; mathematical relationships may be determined by combining or producing machine-learning processes. A related or separate set of mathematical relationships may be used to determine how selection of at least a highly trusted at least a distributed storage node affects each attribute. Protocol implemented in embodiments herein may support varying security and anonymity demands by parties to transactions. For instance, two parties wishing to exchange $5 M over network will demand commensurate security and require some reduction in anonymity to comply with federal laws, in exchange for slightly longer validation times. Conversely, a customer purchasing a coffee at Starbucks will demand relatively little security and may be fully anonymous; a potential malicious actor utilizing a great number of small transactions to hide a large total transaction from regulators may be thwarted by identifying anonymous certificates that are re-used above some threshold and flagged by network. This may allow method 300 to self-adapt to meet varying demands.

With continued reference to FIG. 4, mathematical relationships between attributes and each other and/or between attributes and selection of at least a distributed storage node 108 may be derived by collection of statistics concerning past transactions. In some embodiments, statistical relationships are determined through one or more machine learning processes; for instance, data describing the speed, authenticity, and anonymity of a plurality of past transactions may be subjected to regression analysis, such as linear or polynomial regression, to determine one or more equations relating one parameter of such transactions to one or more other such parameters. Similarly, a neural net may be provided with such a plurality of past transactions. Machine-learning processes may be supervised and/or unsupervised; for instance, attributes to compare may be preselected to ensure that machine-learning processes result in relationships between desired attributes and transaction parameters. Mathematical relationships may demonstrate, e.g., that a certain number of nodes in at least a highly trusted node results in a 95% degree of confidence, that a second, higher number of nodes results in a 98% degree of confidence, and the like. As a further example, mathematical relationships may associate a level of anonymity, as measured in average proportion information content concerning user and/or requesting device 104 obtainable from a transaction, information entropy of transaction, or the like, to average network or geographical distance between nodes of at least a highly trusted node, to selection of protocols to anonymize, and the like. Relationships between, the above parameters and latency may also be represented. Direct relationships between attributes to be optimized may be determined by machine learning processes; alternatively or additionally, such relationships may be determined using relationships of each attribute to parameters of selected device.

One or more additional devices in system 100 may assist in selection of one or more additional devices, which may be distributed storage nodes 108 of plurality of distributed storage nodes 108, one or more verified devices 136, or may be other devices connected to network. For instance, and without limitation, selecting the at least a distributed storage node 108 may include receiving an identification of the at least a second distributed storage node 108 of the plurality of distributed storage nodes from the at least a second distributed storage node 108, and/or a verifying node verifying node 132 as described above, and selecting the at least a distributed storage node 108 as a function of the identification of the at least a distributed storage node 108. The identification of the at least a distributed storage node 108 may include a digitally signed assertion and/or authentication determination generated by the at least a second distributed storage node 108 and/or verifying node 132; digitally signed assertion may be created using any protocol for creation of a digitally signed assertion, including a digital signature signed with a private key possessed and/or generated by at least a distributed storage node 108, a secure proof, as defined above, generated according to any protocol or combination of protocols as described above by first distributed storage node, or the like. Identification of at least a distributed storage node 108 and/or other device may include verification information that may be combined with a secure proof issued by at least a distributed storage node 108 to verify or authenticate at least a distributed storage node, including without limitation an address as described above, a public key as described above, a verification associated with a zero-knowledge proof, or the like. Requesting device 104 may select one or more of at least a distributed storage node 108 (or other device), including less than all distributed storage nodes 108 of at least a distributed storage node 108 (or other device) according to any criteria as described above for selection of at least a distributed storage node 108 and/or any device included in at least a distributed storage node 108, including without limitation by determining confidence levels in individual devices and/or aggregate confidence levels, comparison of confidence levels to threshold values, minimization of cost functions and/or optimization of network distance or latency, or any other procedure described above.

Referring again to FIG. 3, step 315 requesting device 104 generates at least a retrieval verification datum. Retrieval verification datum may be specific to requesting device 104 or verifying node 132, or retrieval verification datum may include a group public key. For example, verification datum may not be tired to a unique identifier of requesting device 104 or verifying node 132, such as DAA key or a token provided by a verifying node. Generating at least a retrieval verification datum may include generating a unique user identifier, which may be generated according to any process or protocol described above for generation of any unique identifier of a person or device. Generating at least a retrieval verification datum may include generating a unique identifier of requesting device 104. Generating at least a retrieval verification datum may include generating a verification datum corresponding to a secure proof as described above. For instance, and without limitation, retrieval verification datum may include a public key and/or digital certificate relating to a private key belonging to or assigned to requesting device 104 and/or a user thereof. Requesting device 104 may include a secure computing module 112 as described above; generation of verification datum may be performed, with or without secure computing module 112, according to any protocol for generation of one or more verification data in connection with any secure proof as described above. Generating at least a retrieval verification datum may include generating a password. Generating at least a retrieval verification datum may include generating at least a reference to a user-specific datum, such as biographical or other data a user may submit for verification or contact information where a second-factor verification may be sent to a user. Generation of at least a retrieval verification datum may include generation or receipt of an authorization token, which may be any datum suitable for use as storage node authorization token as described above.

At step 320, and still referring to FIG. 3, requesting device 104 transmits at least a confidential datum and at least a retrieval verification datum to at least a distributed storage node. Transmitting at least a confidential datum and at least a retrieval verification datum to at least a distributed storage node may include encrypting the at least a confidential datum. Transmitting at least a confidential datum and at least a retrieval verification datum to at least a distributed storage node may include recording the at least a confidential datum in a temporally sequential listing; recording in a temporally sequential listing may be performed according to any means or method described above for inclusion of information in a temporally sequential listing, including placement of information directly in a digitally signed assertion and/or placement indirectly using, without limitation, a Merkle tree or other hash tree, a link or URL, or the like. Transmitting at least a confidential datum and at least a retrieval verification datum to at least a distributed storage node may include recording the at least a retrieval verification datum in a temporally sequential listing. Transmitting at least a confidential datum and at least a retrieval verification datum to at least a distributed storage node may include storing the at least a confidential datum in a distributed data structure; distributed data structure may include a distributed hash table. In an embodiment, distributed data structure may include an authentication listing such as distributed authentication listing instance 136 or may include another authentication listing.

Still viewing FIG. 3, transmitting at least a confidential datum and at least a retrieval verification datum to at least a distributed storage node may include transmitting the at least a confidential datum and the at least a retrieval verification datum to at least a verifying node verifying node 132. At least a verifying node verifying node 132 may, for instance, encrypt at least a confidential datum and assign it to one or more distributed storage nodes 108; distributed storage nodes 108 may, as a non-limiting example, be configured to store any datum provided by a verifying node 132 and transmit any such datum to a verifying node 132 upon request. As a result, distributed storage nodes 108 that are not verified may solely store encrypted data for which they have no decryption information, and/or may have no data linking such data to user of requesting device 104 and/or requesting device 104; this may lead to all potential issues with partially encrypted data and/or identification of user being dealt with by highly trusted verifying nodes while distributed storage nodes 108 may solely provide memory for storage. Alternatively or additionally, requesting device 104 and/or verifying node 132 may compare a confidence level of a distributed storage node 108 to a threshold, and assign encryption, decryption, storage, and/or user authentication tasks only to distributed storage nodes having confidence levels exceeding the threshold.

Continuing to view FIG. 3, transmitting at least a confidential datum and at least a retrieval verification datum to at least a distributed storage node may include dividing the confidential datum into a plurality of shares transmitting each share of the plurality of shares to a different distributed storage node of the at least a distributed storage node; plurality of shares may include secret shares, defined as subdivisions of at least a confidential datum that may be combined to reconstitute at least a confidential datum, but each of which alone is insufficient to deduce anything about at least a confidential datum. In an embodiment, a confidential datum may be reconstructed only when a sufficient number, of possibly different types, of shares are combined together. Shares may include random elements of a finite field that add up to the secret in the field; security of shares may be achieved because any non-qualifying set of shares may appear to be randomly distributed. In an embodiment, individual shares may be of no use on their own. Division of shares may be performed at requesting device 104 and/or a verifying node 132.

Still referring to FIG. 3, secret sharing may involve secure two-party computation and/or secure multiparty computation, with the goal of creating methods for parties to jointly compute a function over their inputs while keeping those inputs private. Two-party computation may involve a cryptographic protocol including a Garbled circuit that may enable two parties without a relationship of trust, or two mistrusting parties, to jointly evaluate a function over their private inputs without the presence of a trusted third party. Garbled circuit protocol used to implement two-part secure computation may include a Boolean circuit. Garbled circuit protocol may include an oblivious transfer where a string is transferred between a sender and a receiver. The sender may have two strings, for example $S_0$ and $S_1$. The receiving party may choose input (i) [0, 1] and send $S_i$ through the oblivious transfer protocol such that the receiver doesn't receive any information about $S_{(1-i)}$ and the value of i is not exposed to the sender. Oblivious transfer protocol may be implemented using asymmetric cryptography such as RSA, for example. Implementation of a Garbled circuit protocol may consist of an underlying function, which may be any arithmetic and/or logical function, described as a Boolean circuit with two or more input gates. Boolean circuit may be known to both sending and receiving parties. Sending party may then garble (encrypt) the circuit and send the encrypted circuit to receiving party. Receiving party may receive encrypted input from sender through oblivious transfer and receiver may then decrypt the circuit and obtain the encrypted outputs. Both sending party and receiving party may then communicate to learn the output.

Continuing to refer to FIG. 3, multi-party computation may involve a given number of participants that each have private data whereby participants want to compute the value of a public function based on that private data while keeping their own inputs secret. Multi-party computation may aim to ensure that there is input privacy so that no information about private data held by the parties can be inferred from the messages sent during the execution of the protocol. The only information that may be inferred about the private data is whatever could be inferred from seeing the output of the function alone. Multi-party computation may also ensure correctness among participants so that any adversarial colluding parties willing to share information or deviate from the instructions during the protocol execution should not be able to force honest parties to output an incorrect result. Correctness may be achieved by a robust protocol whereby the honest parties are guaranteed to compute the correct output, or an abort protocol is put into place so that honest parties abort if they find an error. A multi-party computation protocol employing secret sharing may include data that is shared amongst the parties and a protocol may then be used to evaluate each share.

Still referring to FIG. 3, an example of a secret sharing scheme may involve requesting device 104 and/or a verifying node 132 giving a share of confidential datum to at least a distributed storage node 108; in an embodiment, this may be performed only when specific conditions are fulfilled. A secret sharing scheme may invoke a (t, n) threshold system where there are at least n number of distributed storage nodes 108 that may be given a share of the secret, and requesting device 104 may give each distributed storage node 108 and/or verifying node verifying node 132 a share of the secret in such a way that any group of t (threshold) or more distributed storage nodes 108 can together reconstruct the secret but no group of fewer than t distributed storage nodes 108 can. An example of a common secret sharing scheme may include a cloud computing environment where a key may be distributed over many servers by a threshold secret sharing mechanism. The key may then be reconstructed when needed. Secret sharing may be implemented by Shamir's scheme whereby any t out of n shares may be used to recover the secret. Shamir's scheme may work by taking t points to define a polynomial of degree t−1. The method may proceed to create a polynomial of degree t−1 with the secret as the first coefficient and the remaining coefficients picked at random. Next, n points on a curve describing the polynomial may be found and given to each player. When at least t out of n players reveal their points, there may be sufficient information to fit a (t−1)th degree polynomial to them, the first coefficient being the secret. Secret sharing may also be implemented by Blakley's scheme whereby any n nonparallel (n−1) dimensional hyperplanes interest at a specific point. Secret may be encoded as any single coordinate of the point of intersection. Each player may be given enough information to define a hyperplane, and the secret may be recovered by calculating the planes' point of intersection and then taking a specified coordinate of that intersection. Secret sharing may also be implemented using the Chinese remainder theorem which provides a method to uniquely determine a number S modulo k many pairwise coprime integers. Two secret sharing schemes that make use of the Chinese Remainder Theorem include Mignotte's and Asmuth-Bloom's Schemes. Both are threshold secret sharing schemes, in which the shares are generated by reduction modulo the integers ml, and the secret may be recovered by solving the system of congruences using the Chinese Remainder Theorem.

Continuing to view FIG. 3, at least a confidential datum and the at least a retrieval authentication datum may be distributed among two or more of at least a distributed storage node 108 according to a secret sharing or sharding process. Secret sharing may be implemented by any of the mechanisms and algorithms as described above. Sharding may involve splitting a confidential datum into several pieces or shards so that when enough shards are present, they are able to reconstruct the confidential datum, but each individual shard alone cannot reconstruct the confidential datum; in an embodiment, fewer than a threshold number of shards may be insufficient to reconstruct the confidential datum. Sharding may separate large databases or other data structures into sets of smaller databases or other data structures each of which may be faster to recall and utilize. A shard may consist of an individual partition of at least a confidential datum. Each shard may be held on a separate distributed storage node 108 and/or verifying node verifying node 132 and may spread load. Some data within a confidential datum may remain present in all shards, but some data may only remain present in a single shard. Each shard may act as the single source for this subset of data. Sharding may be implemented in a variety of different ways. Algorithmic sharding may involve a sharded database using a sharding function to locate data. Algorithmic sharding may distribute data by its sharding function and may uniformly distribute data so that each partition may be similarly sized. Examples of algorithmic sharding may include Shamir's Secret Sharing Algorithm, and Memcached. As a non-limiting example, a private key may be split into five shards, but only three may be needed to reconstruct the private key. In an embodiment, distributed storage nodes 108 and/or verifying node verifying node 132, acting as authenticating devices, may require one, a threshold number, or all of the shards to reconstruct the private key. In addition to algorithmic sharding, sharding may also occur by dynamic sharding where an external locator service determines the location of entries. This may be implemented in various ways. For example, if the cardinality of partition keys is relatively low, the locator can be assigned per individual key. However, if the cardinality of partition keys is not so relatively low, then a single locator may address a range of partition keys. Unlike algorithmic sharding, dynamic sharding may generate non-uniform distribution of data. Locators of partition keys may be generated, split, and reassigned for redistributing data. Examples of dynamic sharding may include HDFS, Apache HBase, and MongoDB. Sharding may also occur by entity groups whereby related entities are stored in the same partition with the aim of providing additional capabilities in a single partition. Entity groups may be used to shard relational databases. In an example, queries dedicated to a single partition may have more consistency than queries spanning multiple partitions. Entity groups may be implemented algorithmically or dynamically. Examples of entity group sharding includes RDBMS and Google Megastore.

Continuing to view FIG. 3, distributed key generation may be implemented to encrypt information in which multiple parties may contribute to the calculation of a shared public and private key set. Distributed key generation may not rely on trusted third parties but instead requires participation of a threshold of honest parties to determine whether a key pair can be successfully computed. Distributed key generation may be implemented by a protocol such as the one specified by Gennaro, Jarecki, Krawczyk and Rabin. Such a protocol may be implemented by first having all participating distributed storage nodes 108 and/or verifying devices use Pedersen's verifiable secret sharing protocol to share the results of two random polynomial functions. Each participating node may then verify all the shares that they receive. If a node verification fails, recipient may broadcast a complaint for the node whose share failed. Each accused node may then broadcast their shares. Other nodes may then have the opportunity to verify the broadcast shares or disqualify accused nodes. All nodes may then generate a list of non-disqualified nodes. Each non-disqualified node may then broadcast a set of values constructed by raising a common generator to the power of each value used in one polynomial generated from Pedersen's secret sharing protocol. Each node may then broadcast values in one polynomial, so that when a verification fails, all other nodes reconstruct their own value sets in order to eliminate disqualified contributions. Non-disqualified nodes may then compute a private key as the product of every qualified contribution consisting of each node's random polynomial evaluation. Distributed key generation may also utilize a robust distributed key generator protocol. A robust key generator protocol may include reconstructing public keys in order to remove malicious shares even if malicious nodes still remain in the qualified group. In an embodiment, generation of a private key may be performed by distributed storage nodes 108 and/or verifying nodes 132. Each node may generate part of a private key for example, through a distributed key generation process. In an embodiment, one node may generate an entire key. Keys may also be broken up into shards and stored by distributed storage nodes 108 as described in more detail below in reference to FIG. 6. In an embodiment, a key may be generated first and then split into shards, or shards that may comprise a key may be individually produced so that the key is never originally produced all together at once. Shards may be produced by distributed storage nodes 108, requesting device 104, and/or verifying node 132, or by an individual storage node or other device in system 110.

With continued reference to FIG. 3, distributing at least a confidential datum among two or more of at least a distributed storage node 108 according to a secret sharing or sharding process may include secret sharing or sharding of public/private cryptographic keys, digital signatures, and/or secure proof. At least a confidential datum may include at least a private key of a public key cryptographic system and may also include at least a private key of a private key cryptographic system as described above in reference to FIGS. 1-4. Identifying the at least a distributed storage node 108 may include identifying at least a distributed storage node by evaluating a secure proof generated by at least a distributed storage node including secure proof such as a digital signature. In an embodiment, sharding public/private cryptographic keys, digital signatures, and/or secure proof may ensure the location of storing any one of the previous items at one data storage node 108 does not become a target of attacks. In an embodiment, a private key may be wholly generated and then cut into shards or rather it may be generated in a distributed manner from its conception. In an embodiment, sharding of a private key for example may occur by any of the methods and algorithms as described above.

Continuing to refer to FIG. 3, shards of a private key may be stored independently by different distributed data storage nodes 112 and/or verifying node verifying node 132. Distribution of shards may be performed by numerous methods. Distribution of shards may be automatic and determined by sharding algorithm that is implemented. Distribution may also occur evenly across a set number of data storage nodes 112 and/or verifying node verifying node 132. Distribution of shards may also occur to all nodes so that all data storage nodes 112 and/or verifying node verifying node 132 on a network for example receive a shard. Distribution of shards to data storage nodes 112 and/or verifying node verifying node 132 may be configured to result in selection of at least N of K data storage nodes 112 and/or verifying node 132, where N data storage nodes 112 and/or verifying node 132 are required to store shards. Implementation of the distributed shards may utilize random oracle outputs and/or threshold signatures. Random oracle output may include an output that responds to every unique query with a truly random or pseudorandom response chosen uniformly or preferentially from its output domain; in an embodiment, a pseudorandom output is one that is infeasible to predict prior to performing steps of random oracle, such as without limitation an output including an output of a cryptographic hash function performed on each unique query. If a query is repeated the output may respond the same way every time that query is submitted. In an embodiment, a random oracle output may include a mathematical function chosen uniformly at random, so that each possible query has an output of a fixed random response. A random oracle may include a verifiable delay function, e.g. a function based on exponentiation in a group of unknown order, a verifiable random function as demonstrated by DFINITY of Zug, Switzerland, a random beacon, such as without limitation a high entropy source such as true random number generator (TRNG) that is signed and timestamped by a device with trusted properties such as a secure computing module 112, two or more devices operating under the principle of proof of elapsed time as demonstrated by Hyperledger sawtooth from IBM, or other random leader election mechanism. In an embodiment, key shards may be applied to a random oracle output and assigned, by virtue of the random oracle output, to at least a data storage node 108 and/or verifying node 132.

Still referring to FIG. 3, implementation of distribution of shards may utilize threshold signatures; as a non-limiting example, threshold-optimal DSA/ECDSA signatures, short signatures from the Weil pairing, optimal Ate Pairing over Barreto-Naehrig curves, Noneh-Lynn-Shacham signatures, Full-Domain-Hash or other RSA-based signatures may be used. It will be apparent to those skilled in the art, upon reviewing the entirety of this disclosure, how the foregoing may be further optimized by utilizing properties of secure enclaves, trusted execution environments, or the like in at least a trusted computing module 116 to ensure setup of the signature scheme and/or correct execution of constituent elements. Determination of the required N of K data storage nodes 112 and/or verifying node 132 may further incorporate network security parameters, such as in non-limiting examples an expected adversarial strength and/or acceptable failure probability. In one embodiment, the random selection of one or more data storage nodes 112 and/or verifying node 132 as described above occurs at every authorization request. In an alternative embodiment, the random selection occurs at regular or varying time intervals, such that the cost of random selection is amortized over the handling of multiple authorization requests. In an embodiment, when enough shards stored on at least a data storage node 108 and/or verifying node 132 are present, the shards may be able to recreate the confidential datum. In an embodiment, when enough shards from a public and/or private key are present the shards may also be able to recreate secure proof such as a digital signature. In an embodiment, a digital signature may be recreated from shards corresponding to any secret that may be subjected to sharding and/or secret sharding. In an embodiment, public and private keys, secrets, secure proof, and digital signatures are all connected so that any one can be shared by at least a distributed storage node 108 and/or verifying node verifying node 132 and any one that may be present can be used to generate the other. Any parameters for sharding and/or retrieval or shards or a private key or other confidential datum as described above may be stored in the form of a policy and/or policies in a distributed data structure such as without limitation distributed authentication listing 136 as described above. For instance, a threshold number of devices from which shards and/or elements of at least a confidential datum must be retrieved may be determined according to a policy stored in a distributed data structure; policy and/or threshold may be retrieved from distributed data structure by requesting device 104. For instance, retrieving may include retrieval from a number distributed storage nodes exceeding the threshold number, where "exceeding" may indicate a number equal to or greater than the threshold number.

In an embodiment, and with continued reference to FIG. 3, shards of a private key generated by any of the methods as described above may be stored remotely and/or in separate locations so that compromise of an individual remote instance of a shard is insufficient to gain access, since all or a threshold number of shards would be necessary to reconstruct the private key. In an embodiment, geographical location of shards and/or redundant distribution of copies of keys may be preferential to unlock and/or authenticate on geographically close exchanges. At least a distributed storage node 108 may be chosen as a plurality of clusters, wherein devices within each cluster are proximate to one another, where "proximate" may include any definition provide above of proximity; clusters may be chosen in turn on a geographical, network or other distribution such that a cluster is likely to be proximate to any requesting device likely to attempt retrieval as described in further detail below. Each cluster may have sufficient numbers of devices to recover a secret, such as at least a confidential datum divided in shares or shards; as a result, a distributed storage node 108 may be able to produce confidential datum rapidly. As a further non-limiting example, entities using digital assets such as cryptocurrencies and other securities may prefer to locate a key store containing the cryptocurrency as close to a particular exchange as possible. In an embodiment, multiple copies of keys may be located near a variety of exchanges and each key is then able to unlock whichever one is closest to the highest performing or otherwise most appealing exchange. In an embodiment, distributed storage nodes 108 and/or verifying node verifying node 132 may require a master key to authenticate. For example, a bank may require a master key to authenticate transactions that are valuable, so that failure to authenticate results in revocation of a transaction.

In an embodiment, and still viewing FIG. 3, at least a confidential datum may be stored among a plurality of distributed storage nodes 108 in a hierarchical fashion, wherein at least a first confidential datum of at least a confidential datum is required to access storage of at least a second confidential datum; this hierarchy may be repeated any number of times. Thus, as a non-limiting example, a first set of at least a distributed storage node 108 may store at least a first confidential datum according to any methodology described above, including distributed storage, redundant storage, secret sharing and/or sharding. Thus in an embodiment, at least a distributed storage node may include one or more devices combining to perform a proof of knowledge of at least a first confidential datum. Requirements of proof of knowledge may require one, a threshold number, or all of the provers of knowledge to present information to access the next level of data access (either intermediate device or end remote store) to access at least a second confidential datum; the at least a second confidential datum may be used in turn to access at least a third confidential datum, at least a fourth confidential datum, and so forth. Multiple provers at any level may be implemented via secret sharing and/or sharding using algorithmic, dynamic, or any other sharding mechanism. A final or innermost at least a confidential datum may be used to perform asset transfers, authentication of a user or entity, or the like.

Continuing to refer to FIG. 3, in an embodiment, requesting device 104 may retrieve, from the at least a distributed storage node, the at least a confidential datum. Retrieving may include providing, to at least a distributed storage node 108, a retrieval token as a function of at least a retrieval verification datum. Retrieval token may include a datum demonstrating that requesting device 104 is authorized to retrieve at least a confidential datum; demonstration may be effected by comparison of retrieval token to at least a retrieval verification datum. For instance, where at least a retrieval verification datum includes a verification datum such as a public key, retrieval token may include a secure proof associated with the verification datum, such as a signature associated with the public key. Where at least a retrieval verification datum includes user authentication data, retrieval token may include user verification data. Retrieval token may include a private key. In an embodiment, retrieval token may be specific to requesting device 104, or retrieval token may not be tied to a specific device, and instead be a group identifier such as a group public key. In other words, retrieval token may not be tied to a specific requesting device 104, but rather may be split among several devices and/or nodes. In an embodiment, retrieval token may be different from retrieval authentication datum as described above in FIG. 3. Retrieval token may be a time limited token as described above in reference to FIGS. 3-4, so that retrieval token must be re-authenticated before expiration to continue performing actions as permitted by at least a distributed storage node. Retrieval token may include a signed timestamp and counter value, a passphrase required to decrypt messages on the network, or some combination. Retrieval token may include a digital certificate, as described above in reference to FIGS. 1-4. Retrieval token may include a digital signature as described above in reference to FIGS. 1-4. In an embodiment, digital certificate and/or digital signature may be split among several devices and/or nodes. Retrieval token may be used to retrieve a key and/or a key shard.

With continued reference to FIG. 3, retrieval of at least a confidential datum may include transmission of at least a confidential datum from at least a distributed storage node 108 to requesting device and/or to a device indicated by requesting device 104. Alternatively or additionally, retrieval may include generation by at least a distributed storage node 108 of one or more secure proofs, which may be transmitted to requesting device 104, transmitted to a device indicated by requesting device, and/or entered in a distributed data structure such as a temporally sequential listing. Where storing was performed by sharding, secret sharing, or the like, a sufficient number of shares or shards to reconstruct at least a confidential datum may be retrieved; redundancy of storage may enable both security of distributed storage and robustness or flexibility, as a sufficient number of distributed storage nodes 108 may be selected such that predictable rates of network disconnection or the like do not prevent retrieval. Where at least a confidential datum was stored hierarchically, retrieval may include traversal of the hierarchy through successive proofs of knowledge to retrieve all necessary data of at least a confidential datum.

Continuing to refer to FIG. 3, in an embodiment, upon authentication at least a confidential datum may be provided to requesting device 104 and/or to user. Provision may include provision of a payment link or code, such as a QR code, permitting user to convert a mobile device containing requesting device 104 or the like into a payment device by allowing payment link or code to be scanned. Provision may include provision of a payment to transfer a digital asset such as a cryptocurrency on a distributed ledger such as a blockchain. Cryptocurrency may include Bitcoin, Litecoin, Ethereum, Ripple, Bitcoin Cash, Ethereum, Zcash, NEM, Stellar, NEO, IOTA, Cardano, Dash, Monero, and TRON just to name a few. Provision may generally be accomplished by any suitable means for displaying, printing, or transmitting data. Provision may include decryption or partial decryption of at least a confidential datum; requesting device 104 may alternatively or additionally decrypt at least a confidential datum. At least a confidential datum may be used to generate a digital signature. A digital signature may be generated using a secure proof based on at least a confidential datum; any secure proof and/or digital signature protocol or process as described above may be used to generate digital signature. As a non-limiting example, each of a plurality of distributed storage nodes 108 may provide to requesting device 104 a confidential datum stored at the distributed storage node; confidential datum may include, as a non-limiting example, a key shard, a secret share, secure proof such as a digital signature, public or private key, or other elements as described above. Requesting device 104 may combine a sufficient number of confidential data, such as without limitation shards as described above, from distributed nodes 112 and combine such confidential data to generate a digital signature. Alternatively or additionally, each of a sufficient plurality of distributed nodes 112, such as the N of K distributed nodes needed to recover a key under a sharding operation as described above, may digitally sign a datum using its shard; such individual digital signatures by distributed nodes may combine to form a digital signature created using key shards. Signature may include, without limitation, a digital certificate authenticating requesting device, a digital certificate authenticating an additional device, and/or a digital certificate conferring one or more access rights to another device in system 100. Signature may also be generated by each of a sufficient plurality of distributed nodes 112 signing a datum each using a secure proof, secret share, shard, key or any other store of a secret. For example, one of a plurality of distributed nodes 112 may digitally sign a datum using a secret share, another of a plurality of distributed nodes 112 may digitally sign a datum using a key shard, and yet another one of a plurality of distributed nodes 112 may digitally sign a datum using a secure proof such as a PUF. Individual digital signatures generated by distributed nodes may combine to form a group digital signature using different forms of secure proof and/or secret shares.

Figure 5:
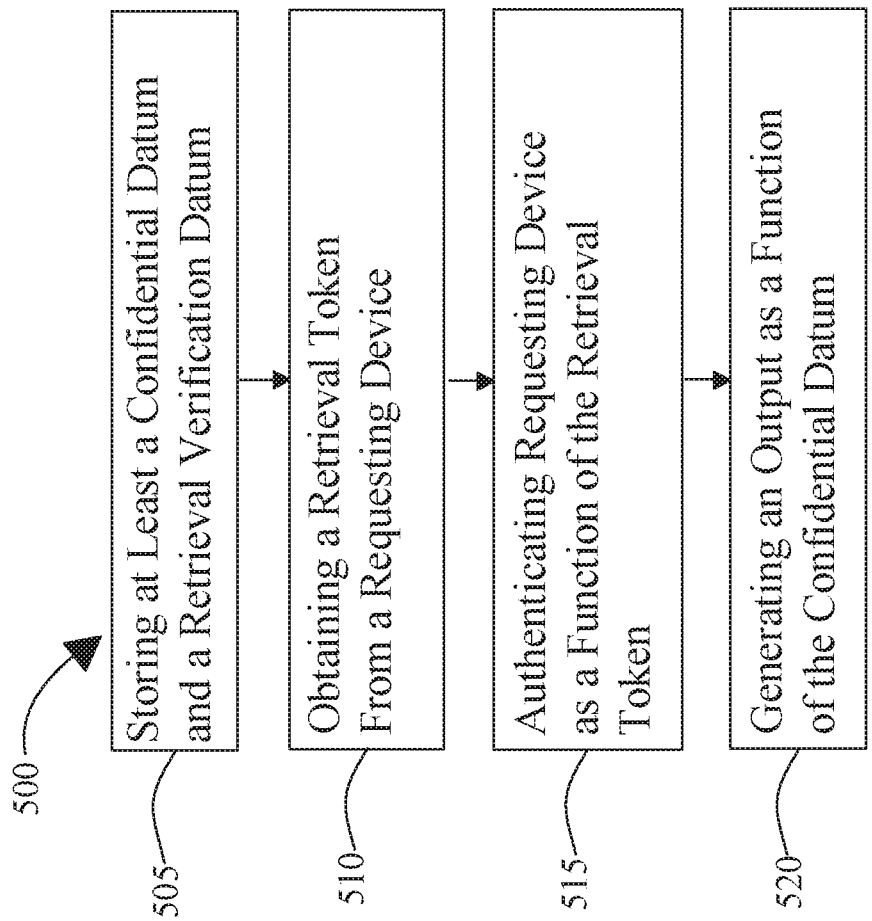
FIG. 5 is a flow diagram illustrating an exemplary embodiment of a method for retrieving an output at a distributed data storage node.

Referring now to FIG. 5, an exemplary embodiment of a method 500 of distributed key storage is illustrated. At step 505, at least a distributed data storage node stores at least a confidential datum and a retrieval verification datum. Confidential datum may include any components as described above in reference to FIG. 3. Retrieval verification datum may also include any components as described above in reference to FIG. 3. In an embodiment, confidential datum may be linked with retrieval verification datum, whereby when distributed storage node 108 is presented with a retrieval token as described below, both confidential datum and retrieval verification datum are linked and retrieved together. Storage may be performed according to any processes or process steps described above in reference to FIGS. 1-4.

With continued reference to FIG. 5, at step 510, at least a distributed storage node obtains a retrieval token from a requesting device. Retrieval token may include any retrieval token as described above in reference to FIGS. 1-4. Requesting device may include any requesting device 104 as described above; requesting device 104 providing retrieval token may be the same requesting device that requested storage of at least a confidential datum as described above in reference to FIGS. 1-4 or may be a different device.

Continuing to refer to FIG. 5, at step 515 at least a distributed storage node 108 authenticates requesting device as a function of the retrieval token. Distributed storage node 108 may authenticate requesting device 104 by matching retrieval token to retrieval verification datum. In an embodiment, distributed storage node 108 may further authenticate requesting device 104 by determining a geographic location of requesting device 104. This may include identifying an internet protocol address of requesting device 104 and determining the geographic location as a function of the internet protocol address. Geographic location may also be determined by evaluating proximity to requesting device 104 having a recorded location. Authentication may also include calculating by at least a distributed storage node a heuristic of trust by determining a duration of past interactions with requesting device 104 and calculating the heuristic of trust as a function of the duration of past interaction or as a function of the most recent time of past interaction. Authentication may also include checking revocation list as described in more detail above in reference to FIG. 4, to make sure authentication privileges have not been revoked. The revocation list may be part of distributed authentication listing instance 136 or revocation list may be a separate listing. Revocation listing may be included in a temporally sequential listing and may be updated frequently to reflect changes in authentication status. Revocation may include a temporal attribute, and devices and/or nodes may move on and off revocation list such as after a quantifiable period of time has elapsed. Authenticating may also include calculating a confidence level of requesting device 104 by any of the methods as described above in reference to FIGS. 1-4. Authentication may also occur by comparing a hash generated from retrieval verification datum to a hash generated from retrieval token. Hashes that are analogous may be authenticated. In an embodiment, retrieval verification datum and/or retrieval token may already exist as a hash value, and hash may not need to be generated in such an instance.

With continued reference to FIG. 5, at step 520 at least a distributed storage node 108 generates an output as a function of the confidential datum. Output may include the at least a confidential datum and/or a portion thereof. In an embodiment, output may include a secure proof as described above in reference to FIGS. 1-4. Secure proof may include zero-knowledge proof. Secure proof may be implemented according to a direct anonymous attestation protocol. In an embodiment, output may include a digital signature. Output may include a partial signature such as a signature generated using a shard that will be later combined with other such signatures to recreate a signature based on the key. In an embodiment, the recreated key may be a public or private cryptographic key. Once generated, output may be provided to requesting device 104. This may include providing output directly to requesting device 104 or providing output to another device that has been verified by requesting device 104. In an embodiment, output may be provided to a temporally sequential listing so that other devices and/or nodes may be able to access output.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
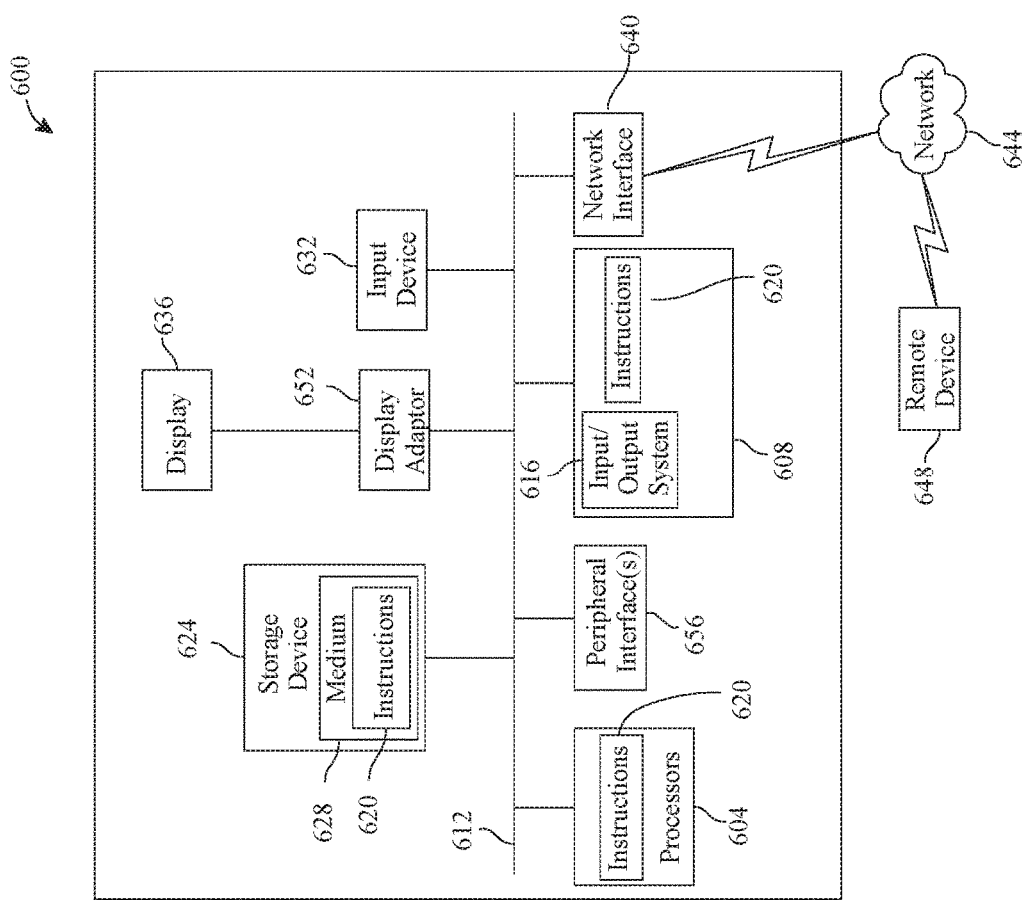
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a requesting device 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within requesting device 604.

Computer system 600 may also include an input device 632. In one example, a user of computer system 600 may enter commands and/or other information into computer system 600 via input device 632. Examples of an input device 632 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with requesting device 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for distributed key storage, the system comprising:
    a requesting device communicatively connected to a plurality of distributed storage nodes, the requesting device designed and configured to:
    receive at least a confidential datum,
    select at least a distributed storage node of a plurality of distributed storage nodes, wherein selecting further comprises:
        receiving a storage node authorization token from the at least a distributed storage node;
        querying an instance of a distributed authentication listing containing authentication information using at least a datum of the storage node authorization token;
        retrieving an authentication determination from the instance of the distributed authentication listing; and
        selecting the at least a distributed storage node as a function of the authentication determination;
    generate at least a retrieval verification datum; and
    transmit the at least a confidential datum and the at least a retrieval verification datum to the at least a distributed storage node.

2. The system of claim 1, wherein the storage node authorization token further comprises a secure proof generated by the at least a distributed storage node.

3. The system of claim 1, wherein the storage node authorization token further comprises a secure proof generated by at least a verifying node.

4. The system of claim 3, wherein an authentication determination further comprises an entry in the distributed authentication listing identifying the at least a verifying node.

5. The system of claim 1, wherein the authorization token includes a time-limited authentication lease.

6. The system of claim 1, wherein selecting the at least a distributed storage node further comprises:
    generating a cost function of confidence level and communication latency; and
    minimizing the cost function.

7. The system of claim 1, wherein the requesting device is further configured to store the at least a retrieval verification datum in a distributed data structure.

8. The system of claim 1, wherein transmitting the at least a confidential datum to the at least a distributed storage node further comprises:
    dividing the confidential datum into a plurality of shares; and
    transmitting each share of the plurality of shares to a different distributed storage node of the at least a distributed storage node.

9. The system of claim 1, wherein the requesting device is further configured to retrieve, from the at least a distributed storage node, the at least a confidential datum.

10. The system of claim 9, wherein retrieving further comprises providing, to the at least a distributed storage node, a retrieval token as a function of the at least a retrieval verification datum.

11. A method for distributed key storage, the method comprising:
    receiving, by a requesting device communicatively connected to a plurality of distributed storage nodes, at least a confidential datum,
    selecting, by the requesting device, at least a distributed storage node of a plurality of distributed storage nodes, wherein selecting further comprises:
        receiving, by the requesting device, a storage node authorization token from the at least a distributed storage node;
        querying, by the requesting device, an instance of a distributed authentication listing containing authentication information using at least a datum of the storage node authorization token;
        retrieving, by the requesting device, an authentication determination from the instance of the authentication listing; and
        selecting, by the requesting device, the at least a distributed storage node as a function of the distributed authentication determination;
    generating, by the requesting device, at least a retrieval authentication datum; and
    transmitting, by the requesting device, the at least a confidential datum and the at least a retrieval authentication datum to the at least a distributed storage node.

12. The method of claim 11, wherein the storage node authorization token further comprises a secure proof generated by the at least a distributed storage node.

13. The method of claim 11, wherein the storage node authorization token further comprises a secure proof generated by at least a verifying node.

14. The method of claim 11, wherein an authentication determination further comprises an entry identifying the at least a verifying node.

15. The method of claim 11, wherein the authorization token includes associating a temporal attribute with the authorization token.

16. The method of claim 11, wherein selecting the at least a distributed storage node further comprises:
    generating a cost function of confidence level and communication latency; and
    minimizing the cost function.

17. The method of claim 11, wherein transmitting the at least a confidential datum and the at least a retrieval verification datum to the at least a distributed storage node further comprises storing the at least a retrieval verification datum in a distributed data structure.

18. The method of claim 11, wherein transmitting the at least a confidential datum and the at least a retrieval verification datum to the at least a distributed storage node further comprises:
  dividing the confidential datum into a plurality of shares; and
  transmitting each share of the plurality of shares to a different distributed storage node of the at least a distributed storage node.

19. The method of claim 11 further comprising retrieving, from the at least a distributed storage node, the at least a confidential datum.

20. The method of claim 19, wherein retrieving further comprises providing, to the at least a distributed storage node, a retrieval token as a function of the at least a retrieval verification datum.

21. The method of claim 19, wherein a policy stored in the distributed authentication listing sets a threshold number of distributed storage nodes and retrieving further comprises retrieval from a number distributed storage nodes exceeding the threshold number.

* * * * *